US012618710B2

(12) United States Patent
Klennert et al.

(10) Patent No.: US 12,618,710 B2
(45) Date of Patent: May 5, 2026

(54) OSCILLATING HEAT PIPE BASED ENERGY BEAM PROFILER AND CALORIMETER

(71) Applicant: The Boeing Company, Chicago, IL (US)

(72) Inventors: Wade Lawrence Klennert, Albuquerque, NM (US); Ralph Russell Galetti, Albuquerque, NM (US)

(73) Assignee: The Boeing Company, Arlington, VA (US)

( * ) Notice: Subject to any disclaimer, the term of this patent is extended or adjusted under 35 U.S.C. 154(b) by 499 days.

(21) Appl. No.: 18/188,398

(22) Filed: Mar. 22, 2023

(65) Prior Publication Data

US 2023/0221177 A1      Jul. 13, 2023

Related U.S. Application Data

(63) Continuation-in-part of application No. 17/372,067, filed on Jul. 9, 2021, now Pat. No. 12,092,531.

(60) Provisional application No. 63/080,628, filed on Sep. 18, 2020.

(51) Int. Cl.
*G01J 1/42* (2006.01)
*G01K 17/00* (2006.01)

(52) U.S. Cl.
CPC .......... *G01J 1/4257* (2013.01); *G01K 17/003* (2013.01); *F28F 2210/00* (2013.01); *F28F 2210/10* (2013.01)

(58) Field of Classification Search
CPC .. G01J 1/4257; G01K 17/003; F28F 2210/00; F28F 2210/10
See application file for complete search history.

(56) References Cited

U.S. PATENT DOCUMENTS

| | | | | |
|---|---|---|---|---|
| 3,364,493 A | * | 1/1968 | Myer | G01J 1/50 |
| | | | | 346/135.1 |
| 4,015,906 A | * | 4/1977 | Sharon | A61B 18/20 |
| | | | | 356/138 |
| 4,596,461 A | * | 6/1986 | DeRosa | G01K 17/003 |
| | | | | 374/E17.002 |
| 4,692,623 A | * | 9/1987 | Roberts | G01K 17/003 |
| | | | | 374/E17.002 |
| 4,797,555 A | * | 1/1989 | La Mar | G01J 1/4257 |
| | | | | 374/161 |
| 4,865,446 A | * | 9/1989 | Inoue | G01J 1/04 |
| | | | | 356/216 |

(Continued)

OTHER PUBLICATIONS

Luke, James R. et al., "High Energy Laser Diagnostic Sensors," AIP Conference Proceedings 1278 (2010), https://doi.org/10.1063/1.3507182, 2 pages.

(Continued)

*Primary Examiner* — Laura Martin
*Assistant Examiner* — Philip L Cotey
(74) *Attorney, Agent, or Firm* — Harrity & Harrity, LLP

(57) ABSTRACT

An energy beam profiler and calorimeter (EPC) includes a target surface configured to receive an impinging energy beam to be profiled by the EPC and generate heat in response to the energy beam. The EPC also includes one or more first oscillating heat pipes (OHPs) arranged to transfer the heat away from a location at which the impinging energy beam strikes the target surface of the EPC. Other features are also provided.

20 Claims, 20 Drawing Sheets

(56)         References Cited

U.S. PATENT DOCUMENTS

| | | | | | |
|---|---|---|---|---|---|
| 4,921,041 | A  * | 5/1990 | Akachi | ................... | F28D 15/00 |
| | | | | | 165/47 |
| 5,156,459 | A  * | 10/1992 | Baker | ................. | G01K 17/003 |
| | | | | | 374/E17.002 |
| 8,711,342 | B2 * | 4/2014 | Elliott | ................. | G01N 21/171 |
| | | | | | 600/407 |
| 9,423,298 | B2 * | 8/2016 | Gu | ........................ | G01J 1/0474 |
| 12,092,531 | B2 | 9/2024 | Klennert et al. | | |
| 2005/0111519 | A1* | 5/2005 | Eigler | ................... | G01K 17/00 |
| | | | | | 374/31 |
| 2010/0040106 | A1* | 2/2010 | Sakami | ................. | G01N 25/64 |
| | | | | | 702/50 |
| 2011/0206077 | A1* | 8/2011 | Schlie | ................... | H01S 3/0604 |
| | | | | | 372/35 |
| 2012/0002193 | A1* | 1/2012 | Elliott | ................. | G01K 17/003 |
| | | | | | 356/121 |
| 2012/0134386 | A1* | 5/2012 | Bender | ................ | G01K 17/003 |
| | | | | | 374/E17.002 |
| 2013/0133871 | A1* | 5/2013 | Ma | ...................... | F28D 15/0266 |
| | | | | | 165/185 |
| 2014/0091198 | A1* | 4/2014 | Shoda | ................... | G01J 1/0448 |
| | | | | | 250/201.1 |
| 2015/0276473 | A1* | 10/2015 | Izumi | ................... | G01J 1/4257 |
| | | | | | 356/121 |
| 2016/0141825 | A1* | 5/2016 | Klennert | ............ | H01S 5/02469 |
| | | | | | 372/34 |
| 2016/0334285 | A1* | 11/2016 | Celikel | ................ | G01J 1/0418 |
| 2020/0025608 | A1* | 1/2020 | Kramer | ................ | G01J 1/0474 |
| 2020/0398385 | A1* | 12/2020 | Alahyari | ................ | B23P 15/26 |
| 2022/0026339 | A1* | 1/2022 | Nguyen | ................ | G01J 1/4257 |

OTHER PUBLICATIONS

Wallace, John, "Laser beam diagnostics: Beam analysis tools each have their own approach," Sep. 16, 2015, 15 pages.
Sage, John Le, "Beam Irradiance on Target Systems (BITS)," Jun. 1, 2013, 3 pages.
Ibraham, Omar T. et al. "An Investigation of a Multi-Layered Oscillating Heat Pipe Additively Manufactured from Ti-6A1-4V Powder," International J. of Heat and Mass Transfer, 2019.
Zhao, Xiaohuan et al., "Micro-Channel Oscillating Heat Pipe Energy Conversion Approach of Battery Heat Dissipation Improvement: A Review," Energies 2022, 15, 7391.
Drolen, Bruce et al., "Advanced Structurally Embedded Thermal Spreader Oscillating Heat Pipe Micro-Gravity Flight Experiment," J. of Thermophysics and Heat Transfer, vol. 36, No. 2, Aug. 26, 2021.

* cited by examiner

1106

1104

OSCILLATING HEAT PIPE BASED ENERGY BEAM PROFILER AND CALORIMETER

CROSS REFERENCE TO RELATED APPLICATIONS

The present application is a continuation-in-part of U.S. patent application Ser. No. 17/372,067, filed Jul. 9, 2021, hereby incorporated herein by reference, which claims priority to U.S. Provisional Application No. 63/080,628 filed Sep. 18, 2020, hereby incorporated herein by reference.

BACKGROUND

1. Technical Field

The field of the present disclosure relates generally to energy beam systems, and more specifically, to test systems for measuring characteristics of an energy beam.

2. Prior Art

Existing, commercially available systems that measure high-energy energy/laser beam profiles are relatively large, power intensive, have low damage thresholds, and require longer measurement times than what is needed for the beam dynamics typically tested on modern high-energy laser systems under field test conditions. These systems are typically limited in the overall area that can be implemented as a target board size. Therefore, there is a need for a system and method that addresses some of these problems, and others.

SUMMARY

Disclosed is an energy beam profiler and calorimeter (EPC). The EPC includes a target surface configured to receive an impinging energy beam to be profiled by the EPC and generate heat in response to the energy beam. The EPC also includes one or more first oscillating heat pipes (OHPs) arranged to transfer the heat away from a location at which the impinging energy beam strikes the target surface of the EPC.

Also disclosed is an EPC comprising a stack of first plates each of which has two major surfaces and a tapered edge, wherein the tapered edges of the first plates form a target surface configured to receive an impinging energy beam, each pair of adjacent tapered edges forming a groove therebetween.

In examples of operation, both EPC configurations perform a method for measuring the calorimetry and beam profile of the energy beam. The method includes absorbing an energy beam at a target surface of the EPC to generate heat; and spreading the heat by one or more first oscillating heat pipes (OHPs) adjacent to the target surface of the EPC.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is an energy beam profiler and calorimeter (EPC). The EPC includes a target surface configured to receive an impinging energy beam to be profiled by the EPC and generate heat in response to the energy beam. The EPC also includes one or more first oscillating heat pipes (OHPs) arranged to transfer the heat away from a location at which the impinging energy beam strikes the target surface of the EPC.

Also disclosed is an EPC comprising a stack of first plates each of which has two major surfaces and a tapered edge, wherein the tapered edges of the first plates form a target surface configured to receive an impinging energy beam, each pair of adjacent tapered edges forming a groove therebetween.

In examples of operation, both EPC configurations perform a method for measuring the calorimetry and beam profile of the energy beam. The method includes absorbing an energy beam at a target surface of the EPC to generate heat; and spreading the heat by one or more first oscillating heat pipes (OHPs) adjacent to the target surface of the EPC.

The EPC and method allow test personnel to accurately, with a high spatial resolution, high measurement frequency, and low measurement latency, measure high-energy beam profile at a target point on the target surface where the target surface may be planar or non-planar. In some embodiments, oscillating heat allow near instantaneous transfer of heat energy from the impinging energy beam to the measurement of changes in temperature at the plurality of column probes and plurality of row probes, allowing for measurement of a rapidly changing beam profile and calorimetry of energy beam.

Figure 1:
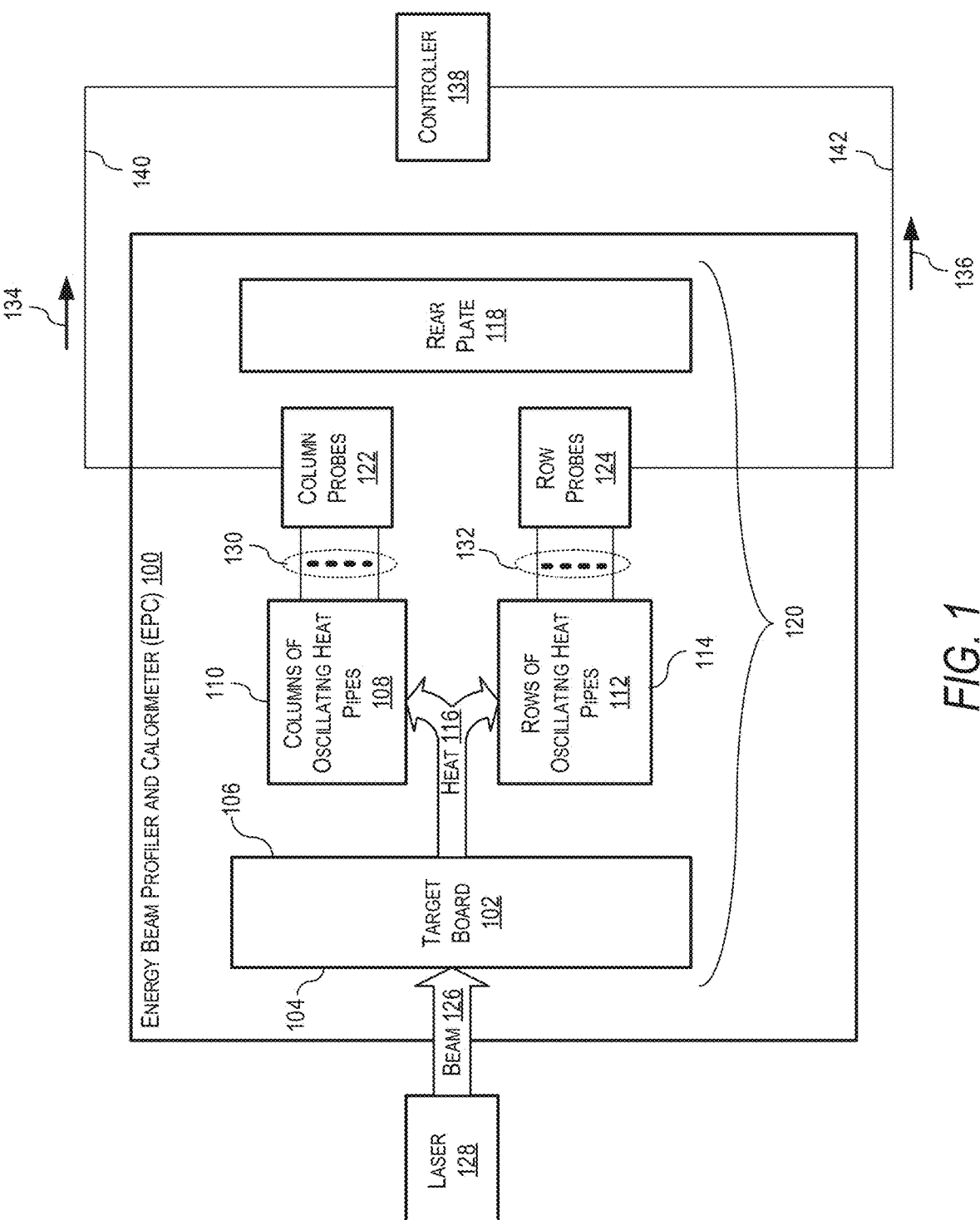
FIG. 1 is a system block diagram of an example of an implementation of an energy beam profiler and calorimeter (EPC) in accordance with the present disclosure.

In FIG. 1, a system block diagram is shown of an example of an implementation of an energy beam profiler and calorimeter (EPC) 100 in accordance with the present disclosure. The EPC 100 includes a target board 102 having a front surface 104 and a back surface 106, a first plurality of oscillating heat pipes 108 arranged as columns on a first plate 110, and a second plurality of oscillating heat pipes 112 arranged as rows on a second plate 114. The first plate 110 and second plate 114 are adjacent to and in thermal communication with the back surface 106 of the target board 102 and are configured to receive conducted heat 116 from the back surface 106 of the target board 102. The EPC 100 may also include a rear plate 118 adjacent to the first plate 110 and the second plate 114, and the EPC 100 may form a sandwich type stack-up 120 that includes the target board 102, the first plate 110, second plate 114 and rear plate 118. The EPC 100 may also include a plurality of column probes 122 and a plurality of row probes 124. In this example, each column probe of the plurality of column probes 122 is in thermal communication with an individual oscillating heat pipe of the first plurality of oscillating heat pipes 108. Similarly, in this example, each row probe of the plurality of row probes 124 is in thermal communication with an individual oscillating heat pipe of the second plurality of oscillating heat pipes 112. In another example, a single probe may be utilized with two oscillating heat pipes to form two oscillating heat pipe channels.

The target board 102 is configured to receive an energy beam 126 from an energy source 128 at the front surface 104 of the target board 102 and produce the conducted heat 116 from energy of the energy beam 126 that is thermally conducted from the back surface 106 of the target board 102 to the first plurality of oscillating heat pipes 108 and second plurality of oscillating heat pipes 112. The first plurality of oscillating heat pipes 108 and second plurality of oscillating heat pipes 112 are configured to receive the conducted heat 116 and transfer the received conducted heat 116 to the plurality of column probes 122 and plurality of row probes 124, respectively, via a first plurality of individual oscillating heat pipes 130 organized into individual columns and second plurality of individual oscillating heat pipes 132 organized into individual rows. The plurality of column probes 122 and plurality of row probes 124 are then configured to produce a first plurality of probe signals 134 and second plurality of probe signals 136 that may be transmitted to a controller 138 external to the EPC 100 that is in signal communication with the EPC 100 via signal paths 140 and 142, respectively.

It is appreciated by those of ordinary skill in the art that the circuits, components, modules, and/or devices of, or associated with, the EPC 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats, without passing through a direct electromagnetic connection.

Figure 2:
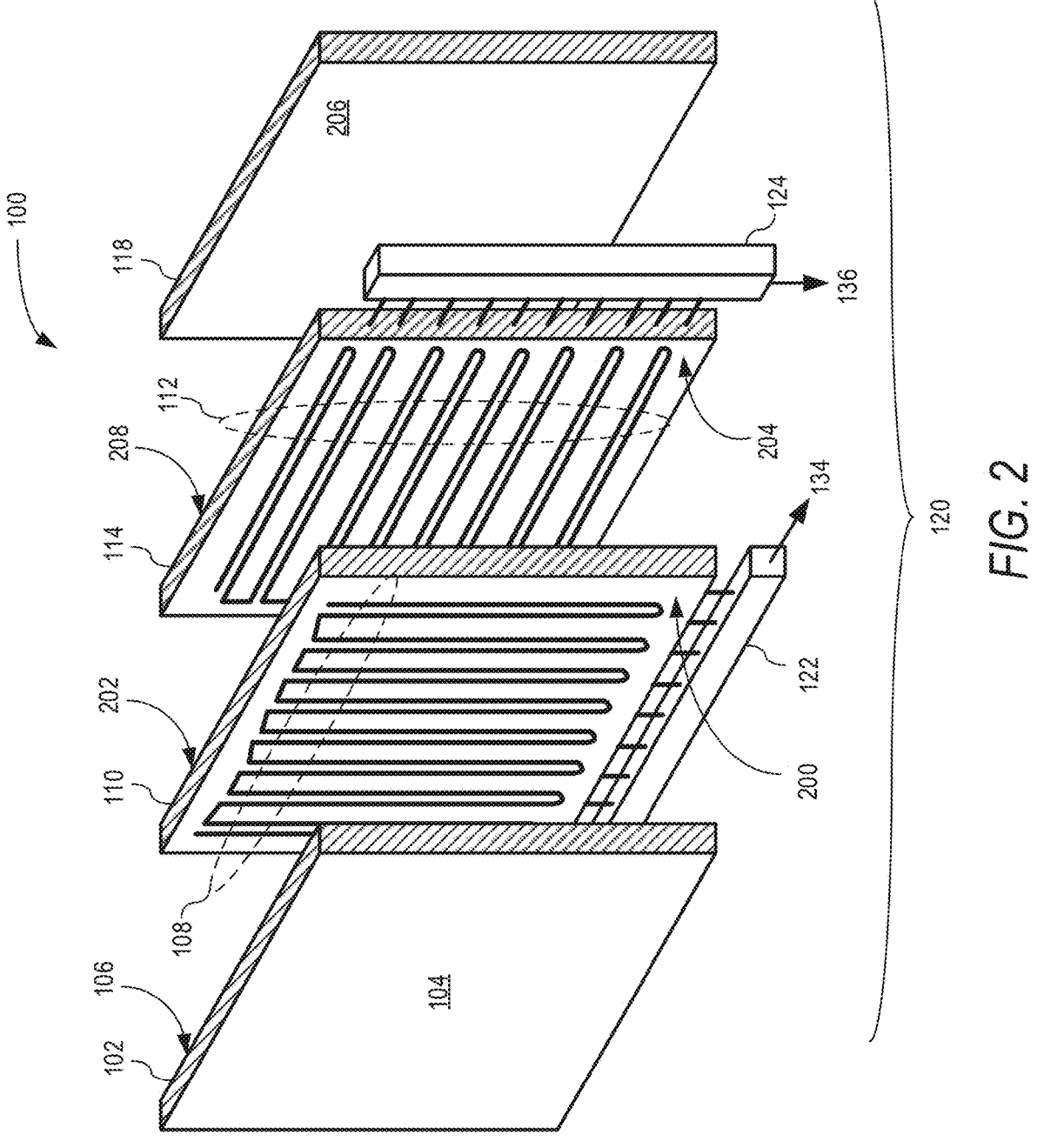
FIG. 2 is an exploded perspective view of the sandwich type stack-up of the EPC shown in FIG. 1 in accordance with the present disclosure.

In FIG. 2, an exploded perspective view of the sandwich type stack-up 120 of the EPC 100 is shown in accordance with the present disclosure. In this example, the first plate 110 is shown adjacent to and in physical contact with the back surface 106 of the target board 102, where a front surface 200 of the first plate 110 is adjacent to and in physical contact with the back surface 106 of the target board 102. The first plate 110 also includes a back surface 202 that is adjacent to and in physical contact with a front surface 204 of the second plate 114. The rear plate 118 includes a front surface 206 that is adjacent to and in physical contact with a back surface 208 of the second plate 114. In this example, the back surface 106 of the target board 102 is in thermal communication with both the front surface 200 of the first plate 110 and front surface 204 of the second plate 114, where the first plurality of oscillating heat pipes 108 are located on the front surface 200 of the first plate 110 and the second plurality of oscillating heat pipes 112 are located on the front surface 204 of the second plate 114. Furthermore, in this example, the first plurality of oscillating heat pipes 108 are arranged as columns of individual oscillating heat pipes along the front surface 200 of the first plate 110 and the second plurality of oscillating heat pipes 112 are arranged as rows of individual oscillating heat pipes along the front surface 204 of the second plate 114. The rows of the first plurality of oscillating heat pipes 108 are approximately orthogonal to the columns of the second plurality of oscillating heat pipes 112. The rows of the second plurality of oscillating heat pipes 112 are in thermal communication with the plurality of row probes 124 and the columns of the first plurality of oscillating heat pipes 108 are in thermal communication with the plurality of column probes 122.

Alternatively, instead of the first plate 110, the second plate 114 may be adjacent to and in physical contact with the back surface 106 of the target board 102, where the front surface 204 of the second plate 114 is adjacent to and in physical contact with the back surface 106 of the target board 102. In this example, the front surface 200 of the first plate 110 is adjacent to and in physical contact with the back surface 208 of the second plate 114 and the front surface 206 of the rear plate 118 is adjacent to and in physical contact with the back surface 202 of the first plate 110. As discussed earlier, in this example, the back surface 106 of the target board 102 is in thermal communication with both the front surface 204 of the second plate 114 and front surface 200 of the first plate 110, where the first plurality of oscillating heat pipes 108 are located on the front surface 200 of the first plate 110 and the second plurality of oscillating heat pipes 112 are located on the front surface 204 of the second plate 114. Again, the first plurality of oscillating heat pipes 108 are arranged as columns of individual oscillating heat pipes along the front surface 200 of the first plate 110 and the second plurality of oscillating heat pipes 112 are arranged as rows of individual oscillating heat pipes along the front surface 204 of the second plate 114. The rows of the first plurality of oscillating heat pipes 108 are approximately orthogonal to the columns of the second plurality of oscillating heat pipes 112. The rows of the second plurality of oscillating heat pipes 112 are in thermal communication with the plurality of row probes 124 and the columns of the first plurality of oscillating heat pipes 108 are in thermal communication with the plurality of column probes 122.

Figure 3:
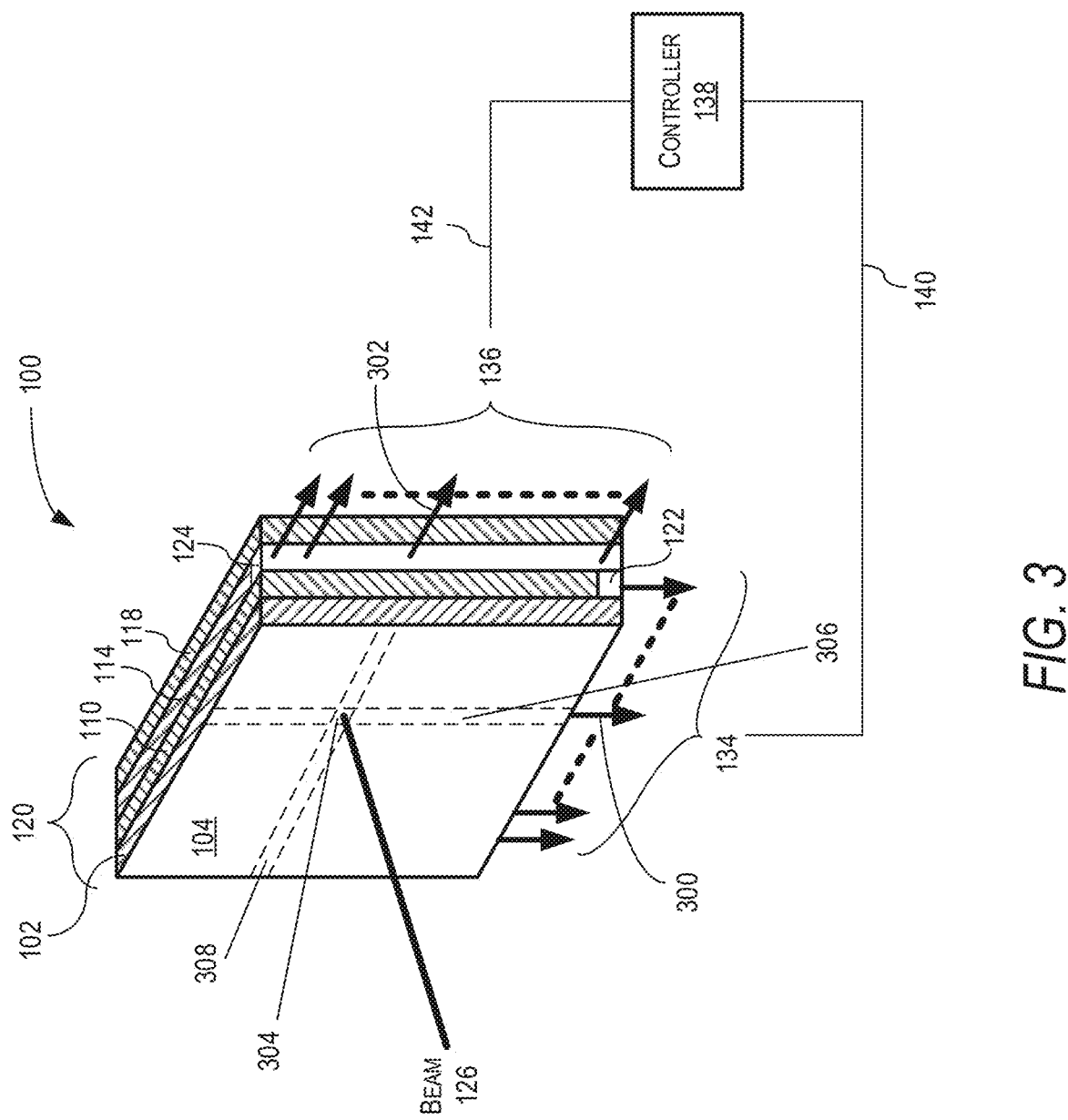
FIG. 3 is a perspective view of an example of an implementation of the EPC shown in FIGS. 1 and 2 in accordance with the present disclosure.

In FIG. 3, a perspective view of an example of an implementation of the EPC 100 is shown in accordance with the present disclosure. The EPC 100 is shown in signal communication with the controller 138 via the plurality of column probes 122 and plurality of row probes 124. As described earlier, in this example, the sandwich type stack-up 120 of the EPC 100 includes the target board 102, first plate 110, plurality of column probes 122, second plate 114, plurality of row probes 124, and rear plate 118.

In this example, the EPC 100 is configured to receive the energy beam 126 on the front surface 104 of the target board 102 and then transfer the conducted heat 116 to the plurality of column probes 122 and plurality of row probes 124 to produce a first column probe signal 300 and a first row probe signal 302. In an example of operation, the EPC 100 receives the impinging energy from the energy beam 126 on the target board 102 at a target point 304 along the front surface 104 of the target board 102. The conducted heat 116 is produced on the back surface 106 of the target board 102 by the impinging energy on the target point 304. The conducted heat 116 is thermally transferred to both the first plurality of oscillating heat pipes 108 and the second plurality of oscillating heat pipes 112. In this example, a first conducted heat pipe (of the first plurality of oscillating heat pipes 108) receives the conducted heat 116 and transfers it to a first column probe (of the plurality of column probes 122) along a first column 306 of the EPC 100. Similarly, a first conducted heat pipe (of the second plurality of oscillating heat pipes 112) receives the conducted heat 116 and transfers it to a first row probe (of the plurality of row probes 124) along a row 308 of the EPC 100. The first column probe produces first column probe signal 300 and the first row probe produces the first row probe signal 302, where the first column probe signal 300 is transmitted to the controller 138 with the first plurality of probe signals 134 via the signal path 140 and the first row probe signal 302 is transmitted to the controller 138 with the second plurality of probe signals 136 via the signal path 142.

The controller 138 is then a device or system configured to receive the first plurality of probe signals 134 and second plurality of probe signals 136 and, in response, determine a spatial intensity profile of the energy beam 126 at the target point 304, where the target point 304 is a particular plane that is transverse to the propagation path of the energy beam 126. In general, there are many types of energy beams such as lasers (i.e., energy source 128) that include, for example, ultraviolet, visible, infrared, continuous wave, pulsed, high-power, low-power, etc. The EPC 100 may be designed for use with these different types of energy beams sources such as lasers.

Since the EPC 100 transfers the conducted heat 116 to the individual column and row probes along individual oscillating heat pipes that correspond to individual columns and rows along the front surface 104 of the target board 102, the EPC 100 acts as an energy calorimeter because the resulting increase in temperature at the target point 304 caused by the impinging energy beam 126 can be measured when the conducted heat 116 produced at the back surface 106 of the target board 102 (which corresponds to the increase in temperature at the target point 304) is transferred to the column and row probes through the corresponding oscillating heat pipes.

Figure 4:
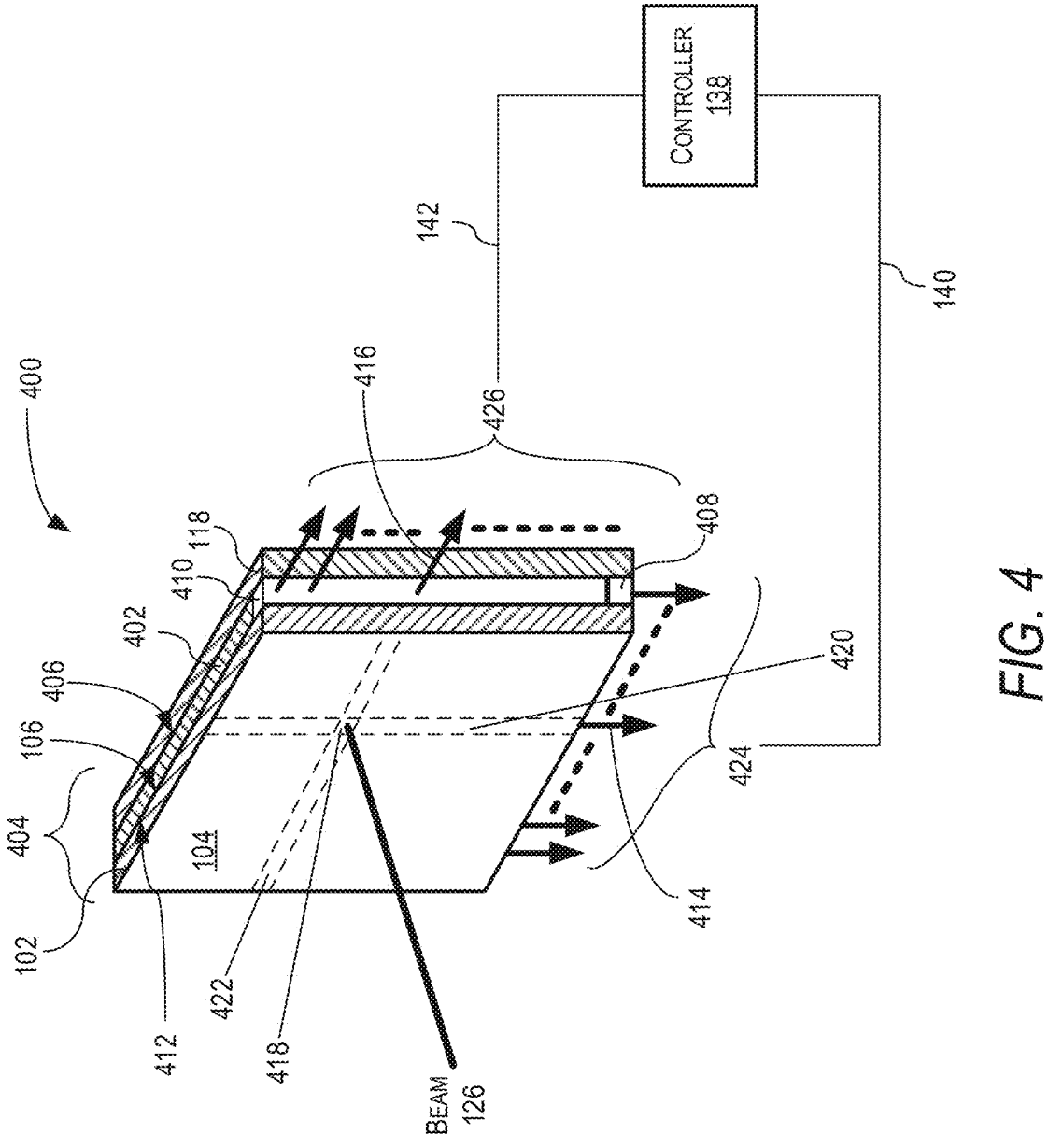
FIG. 4 is a perspective view of an example of an implementation of another EPC having a middle plate in accordance with the present disclosure.

In yet another alternative, the first plate 110 and second plate 114 may be combined or substituted by a single middle plate that includes both the first plurality of oscillating heat pipes and second plurality of oscillating heat pipes. Turning to FIG. 4, a perspective view of an example of an implementation of another EPC 400 having a middle plate 402 is shown in accordance with the present disclosure.

In this example, similar to the example described in regard to FIGS. 1-3, the EPC 400 includes the target board 102 having the front surface 104 and the back surface 106 and the rear plate 118. As described earlier, the target board 102 is configured to receive the impinging energy beam 126 at the front surface 104 of the target board 102. The EPC 400 also includes a first plurality of oscillating heat pipes arranged as columns on a middle plate 402 and a second plurality of oscillating heat pipes arranged as rows on the middle plate 402. In this example, instead of including the first plate 110 and second plate 114, the EPC 400 includes the middle plate 402 in a sandwich type stack-up 404 between the target board 102 and the rear plate 118, where the middle plate 402 is adjacent to and in thermal communication with the back surface 106 of the target board 102. The rear plate 118 is adjacent to a back surface 406 of the middle plate 402. As described earlier, the rows of the second plurality of oscillating heat pipes are approximately orthogonal to the columns of the first plurality of oscillating heat pipes.

The EPC 400 also includes a plurality of column probes 408 in thermal communication with the first plurality of oscillating heat pipes and a plurality of row probes 410 in thermal communication with the second plurality of oscillating heat pipes. In this example, the first plurality of oscillating heat pipes is arranged as columns on a front surface 412 of the middle plate 402 and the second plurality of oscillating heat pipes is arranged as rows on the front surface 412 of the middle plate 402 below the first plurality of oscillating heat pipes. Alternatively, the second plurality of oscillating heat pipes may be arranged as rows on the front surface of the middle plate 402 above the first plurality of oscillating heat pipes.

As before, each oscillating heat pipe of the first plurality of oscillating heat pipes is a column channel and each column probe of the plurality of column probes 408 is a column temperature probe configured to measure a temperature of the column channel. Moreover, each oscillating heat pipe of the second plurality of oscillating heat pipes is a row channel and each row probe of the plurality of row probes 410 is a row temperature probe configured to measure a temperature of the row channel.

In this example, the EPC 400 is configured to receive the energy beam 126 on the front surface 104 of the target board 102 and then transfer the conducted heat 116 to the plurality of column probes 408 and plurality of row probes 410 to produce a first column probe signal 414 and a first row probe signal 416. Similar to the previous example, in an example of operation, the EPC 400 receives the impinging energy from the energy beam 126 on the target board 102 at the target point 418 along the front surface 104 of the target board 102. The conducted heat 116 is produced on the back surface 106 of the target board 102 by the impinging energy on the target point 418. The conducted heat 116 is thermally transferred to both the first plurality of oscillating heat pipes and the second plurality of oscillating heat pipes. In this example, a first oscillating heat pipe (of the first plurality of oscillating heat pipes) receives the conducted heat 116 and transfers it to a first column probe (of the plurality of column probes 408) along a first column 420 of the EPC 100. Similarly, a first oscillating heat pipe (of the second plurality of oscillating heat pipes) receives the conducted heat 116 and transfers it to a first row probe (of the plurality of row probes 410) along a row 422 of the EPC 400. The first column probe produces the first column probe signal 414 and the first row probe produces the first row probe signal 416, where the first column probe signal 414 is transmitted to the controller 138 with a first plurality of probe signals 424 via the signal path 140 and the first row probe signal 416 is transmitted to the controller 138 with a second plurality of probe signals 426 via the signal path 142.

Again, since the EPC 400 transfers the conducted heat 116 to the individual column and row probes along individual oscillating heat pipes that correspond to individual columns and rows along the front surface 104 of the target board 102, the EPC 400 acts as an energy calorimeter because the resulting increase in temperature at the target point 418 (caused by the impinging energy beam 126) can be measured when the conducted heat 116 produced at the back surface 106 of the target board 102 (which corresponds to the increase in temperature at the target point 418) is transferred to the column and row probes through the corresponding oscillating heat pipes.

In this disclosure, it is appreciated by those of ordinary skill in the art that an oscillating heat pipe (also generally known as a "pulsating heat pipe") is a thermally pumped, two phase device that is formed by a one or more meandering, hermetically sealed tube that crosses heating and cooling zones multiple times. Generally, the tube(s) is/are filled with a saturated two-phase mixture that, due to the tube diameter and fluid properties, forms a train of liquid "plugs" and "vapor bubbles." When heat is applied and absorbed by the fluid in the heat pipe(s), the resulting evaporation and condensation processes create pressure imbalances that, coupled with the random distribution of liquid plugs and vapor bubbles, generates motion of the two-phase mixture within the tube(s).

More specifically, an oscillating heat pipe is a passive heat transfer device that transports heat using two-phase fluid flow within capillary-sized tubes (i.e., pipes, tunnels sized such that they have a capillary effect on a working fluid disposed therein) which have a meandering, tortuous path traveling between areas of the device in thermal contact with one or more heat sources and one or more heat sinks or cooling zones. The volume of the tube pattern is partly filled with a working fluid and hermetically sealed from the outside environment. The tube's hydraulic diameter must be small enough and the surface tension of the working fluid great enough such that the fluid disperses itself throughout the tube interior area in discrete liquid plugs and vapor bubbles because of capillary action.

Figure 5:
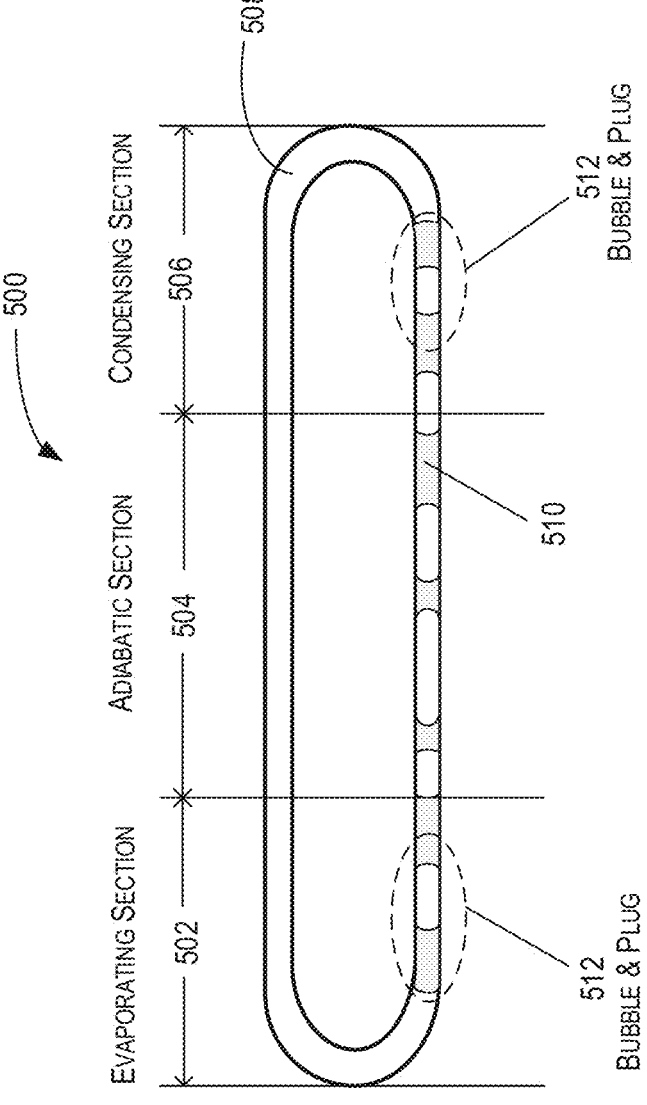
FIG. 5 is a system diagram of an example of an implementation of a single loop oscillating heat pipe in accordance with the present disclosure.

Turning to FIG. 5, a system diagram of an example of an implementation of a single loop oscillating heat pipe 500 is shown in accordance with the present disclosure. In this example, the basic concept and principle of the single loop oscillating heat pipe 500 is shown. The single loop oscillating heat pipe 500 includes an evaporating section 502, adiabatic section 504, and condensing section 506. The single loop oscillating heat pipe 500 uses capillary heat pipe action in a closed loop channel 508 filled with a working fluid 510 having plugs and vapor bubbles 512. In this example, the closed loop channel does not have any "wicks" like open loop heat pipes. In this example, a large "effective" thermal conductivity is created as a result of a unidirectional flow and the evaporation-condensation action (through the evaporating section 502, adiabatic section 504, and condensing section 506) of the working fluid 510. The resulting latent heat of vaporization is a thermal process known as the oscillating motion of the liquid plugs and vapor bubble 512. The pressure created during the working fluid 510 vaporization creates the oscillatory motion which has a frequency determined by the design of the single loop oscillating heat pipe 500. In this example, the working fluid 510 may be, for example, water, acetone and ammonia at room temperature, nitrogen for cryogenic operation and with alkali and other metal vapors at temperatures toward 100° Centigrade and higher. In general, the single loop oscillating heat pipe 500 utilizes the pressure change in volume expansion and contraction during phase change to excite the oscillation motion of the liquid plugs and vapor bubbles 512.

Properties of the single loop oscillating heat pipe 500 include: the single loop oscillating heat pipe 500 is an "active" cooling device, in that it converts intensive heat from the high-power generating device (such as energy beam 126) into kinetic energy of the working fluid 510 in support of the oscillating motion; liquid flow does not interfere with the vapor flow in high heat removal because both phases flow in the same direction; the thermally-driven oscillating flow inside the capillary tube (i.e., closed loop channel 508) will effectively produce some "blank" surfaces that significantly enhance evaporating and condensing heat transfer; and the oscillating motion in the closed loop channel 508 significantly enhances the forced convection in addition to the phase-change heat transfer.

Figure 6:
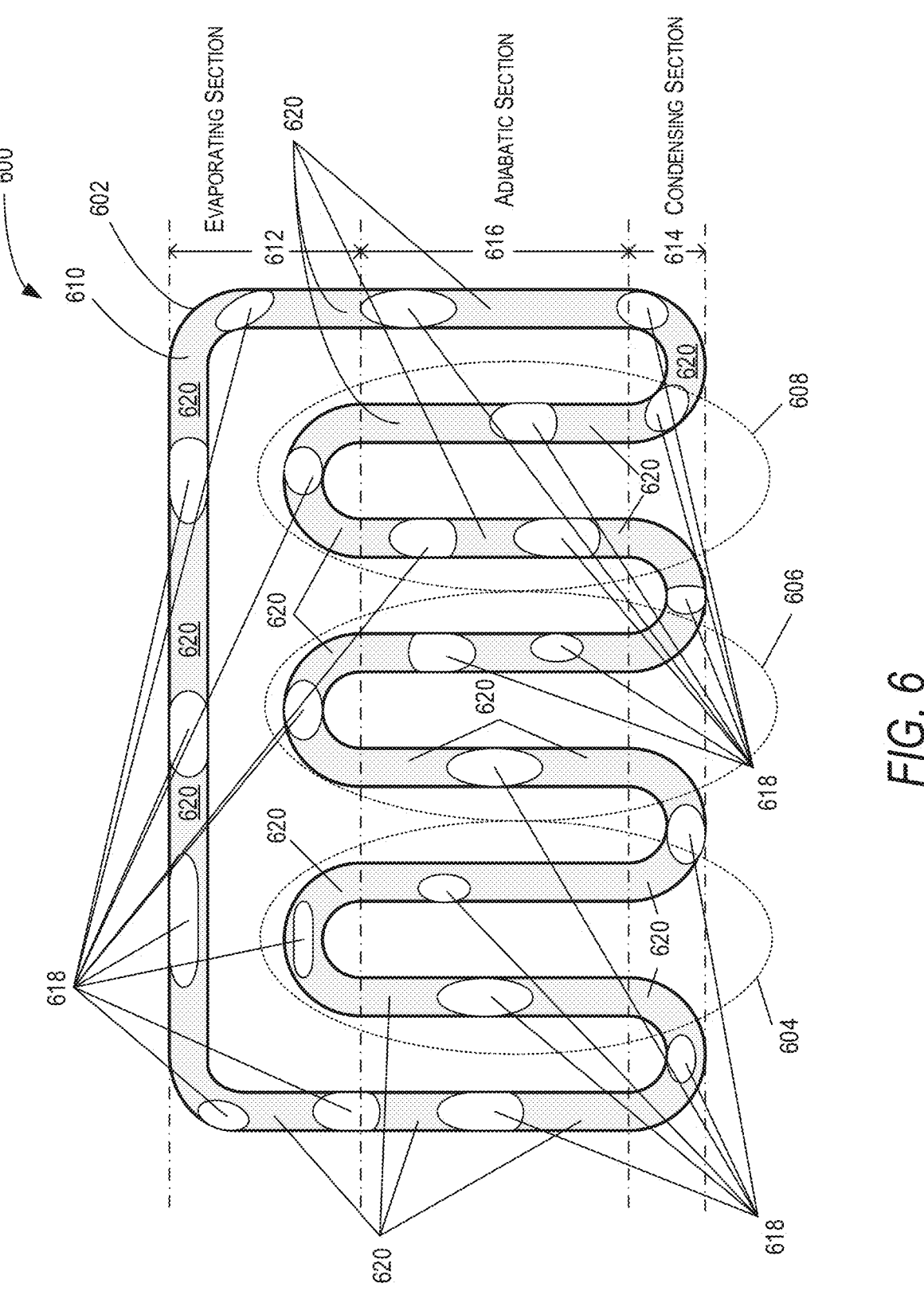
FIG. 6 is a system diagram of an example of an implementation of a multiple loop oscillating heat pipe having a meandering and serpentine pattern in accordance with the present disclosure.

For large heat transfer applications, the single loop oscillating heat pipe 500 does not typically provide enough heat transfer. As such, oscillating heat pipes for large heat transfer typically utilize multiple loops of the channel. In FIG. 6, a system diagram of an example of an implementation of a multiple loop oscillating heat pipe 600 having a meandering and/or serpentine pattern is shown in accordance with the present disclosure. In this example, the multiple loop oscillating heat pipe 600 is still a closed loop tube/channel 602 having a meandering pattern that includes, for example, a first oscillating heat pipe 604, a second oscillating heat pipe 606, and third oscillating heat pipe 608, where the first oscillating heat pipe 604, a second oscillating heat pipe 606, and third oscillating heat pipe 608 are serpentine portions of the multiple loop oscillating heat pipe 600. In an example of operation, the working fluid 610 oscillates back and forth through the multiple loop oscillating heat pipe 600 transferring heat energy from an evaporator section 612 to a condensing section 614 (through an adiabatic section 616) with an effective high thermal conductivity. This oscillation of the "bubbles" 618 within and "plugs" 620 of the working fluid 610 within the tube 602 and convective movement provides for significant heat transfer within the multiple loop oscillating heat pipe 600.

Figures 7A, 7B:
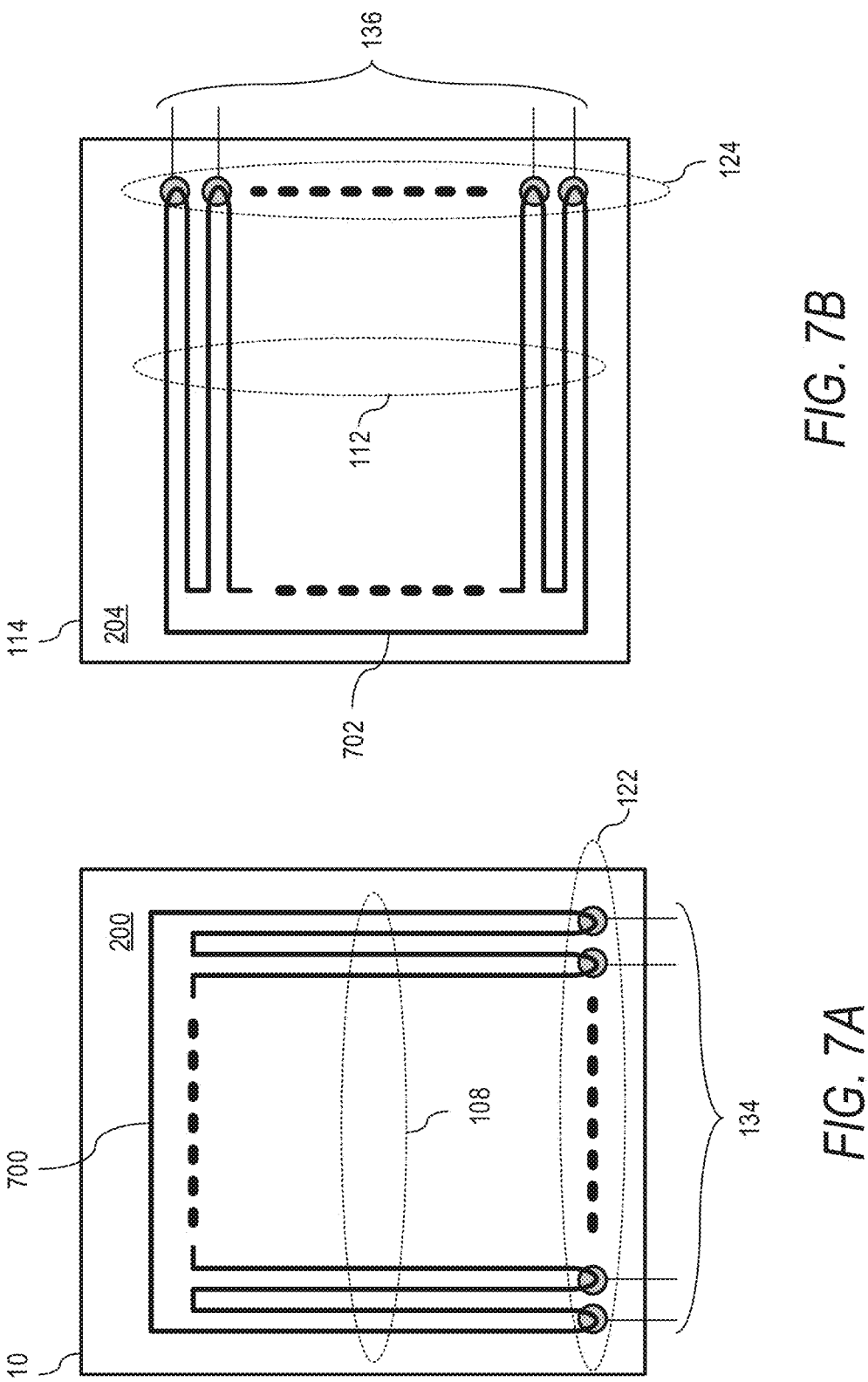
FIG. 7A is a front view of a system diagram of an example of an implementation of oscillating heat pipe on a first plate for use with the EPC of FIG. 1 in accordance with the present disclosure.
FIG. 7B is a front view of a system diagram of an example of an implementation of oscillating heat pipe on a second plate for use with the EPC of FIG. 1 in accordance with the present disclosure.

FIG. 7A is a front view of a system diagram of an example of an implementation of the oscillating heat pipe on the first plate 110 for use with the EPC 100 in accordance with the present disclosure. In this example, the first plurality of oscillating heat pipes 108 are shown to be part of a first multiple loop oscillating heat pipe 700. The plurality of column probes 122 are shown to be in physical contact and thermal communication with serpentine bends of each of the oscillating heat pipes of the first plurality of oscillating heat pipes 108. Similarly, in FIG. 7B, a front view of a system diagram of an example of an implementation of oscillating heat pipe on the second plate 114 for use with the EPC 100 is shown in accordance with the present disclosure. In this example, the second plurality of oscillating heat pipes 112 are shown to be part of a second multiple loop oscillating heat pipe 702. The plurality of column probes 122 are shown to be in physical contact and thermal communication with serpentine bends of each of the oscillating heat pipes of the first plurality of oscillating heat pipes 108 and the plurality of row probes 124 are shown to be in physical contact and thermal communication with serpentine bends of each of the oscillating heat pipes of the second plurality of oscillating heat pipes 112.

Figure 8:
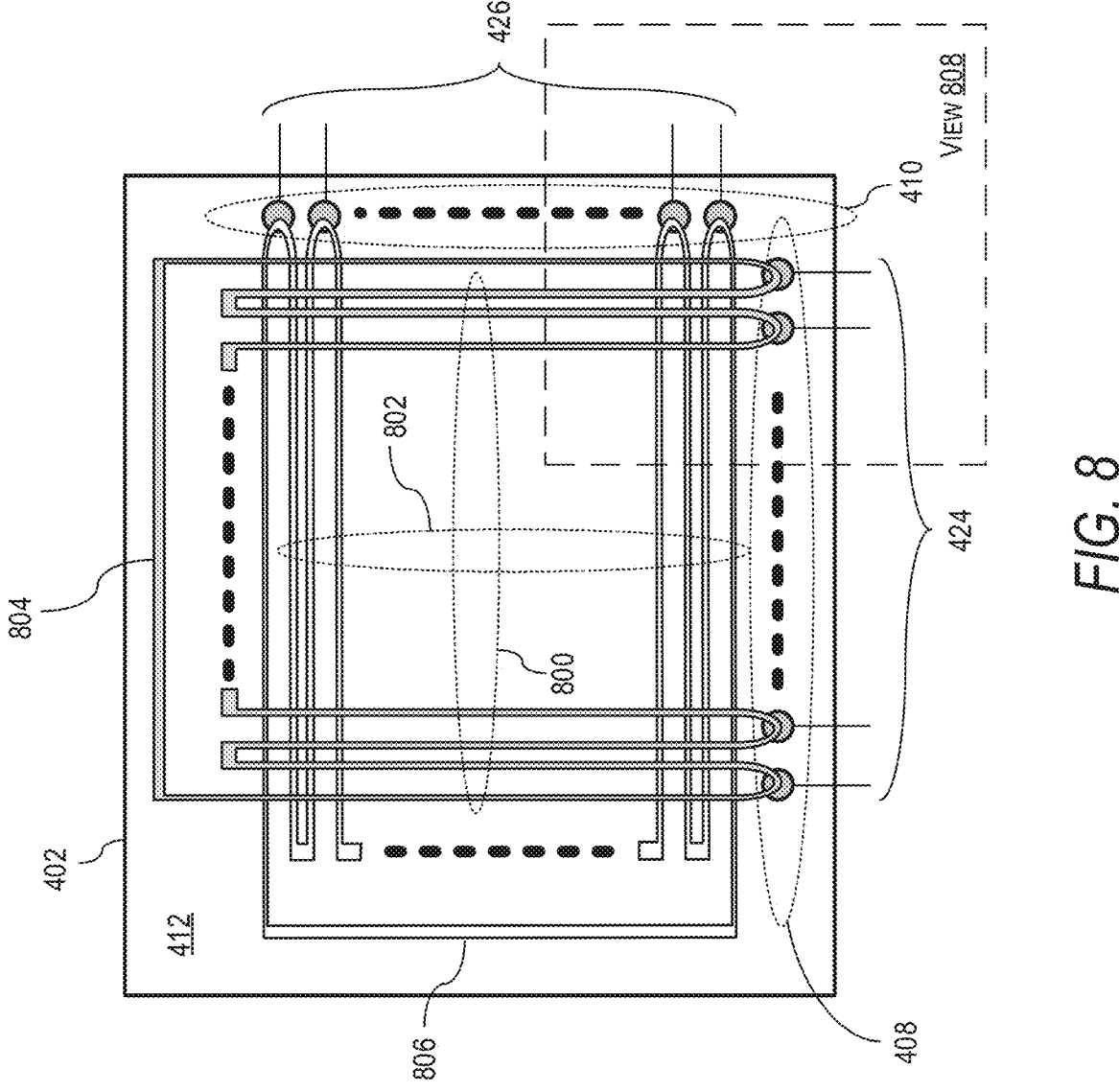
FIG. 8 is a front view of a system diagram of an example of an implementation of oscillating heat pipes on a middle plate for use with the EPC of FIG. 4 in accordance with the present disclosure.

Turning to FIG. 8, a front view of a system diagram of an example of an implementation of oscillating heat pipes on the middle plate 402 for use with the EPC 400 is shown in accordance with the present disclosure. The oscillating heat pipes include a first plurality of oscillating heat pipes 800 and a second plurality of oscillating heat pipes 802 that are oriented approximately orthogonal to the first plurality of oscillating heat pipes 800. In this example, the first plurality of oscillating heat pipes 800 located on the front surface 412 of the middle plate 402 above the second plurality of oscillating heat pipes 802. As described earlier, the first plurality of oscillating heat pipes 800 may alternatively be located on the front surface 412 of the middle plate 402 below the second plurality of oscillating heat pipes 802. In this example, the first plurality of oscillating heat pipes 800 are shown to be part of a first multiple loop oscillating heat pipe 804 and the second plurality of oscillating heat pipes 802 are shown to be part of a second multiple loop oscillating heat pipe 806. The plurality of column probes 408 are shown to be in physical contact and thermal communication with serpentine bends of each of the oscillating heat pipes of the first plurality of oscillating heat pipes 800 and the plurality of row probes 410 are shown to be in physical contact and thermal communication with serpentine bends of each of the oscillating heat pipes of the second plurality of oscillating heat pipes 802. In this example, each of the oscillating heat pipes of the first plurality of oscillating heat pipes 800 are arranged as columns on the front surface 412 of the middle plate 402 and the each of the oscillating heat pipes of the second plurality of oscillating heat pipes 802 are arranged as rows on the front surface 412 of the middle plate 402 either below or above the first plurality of oscillating heat pipes 800.

Figure 9:
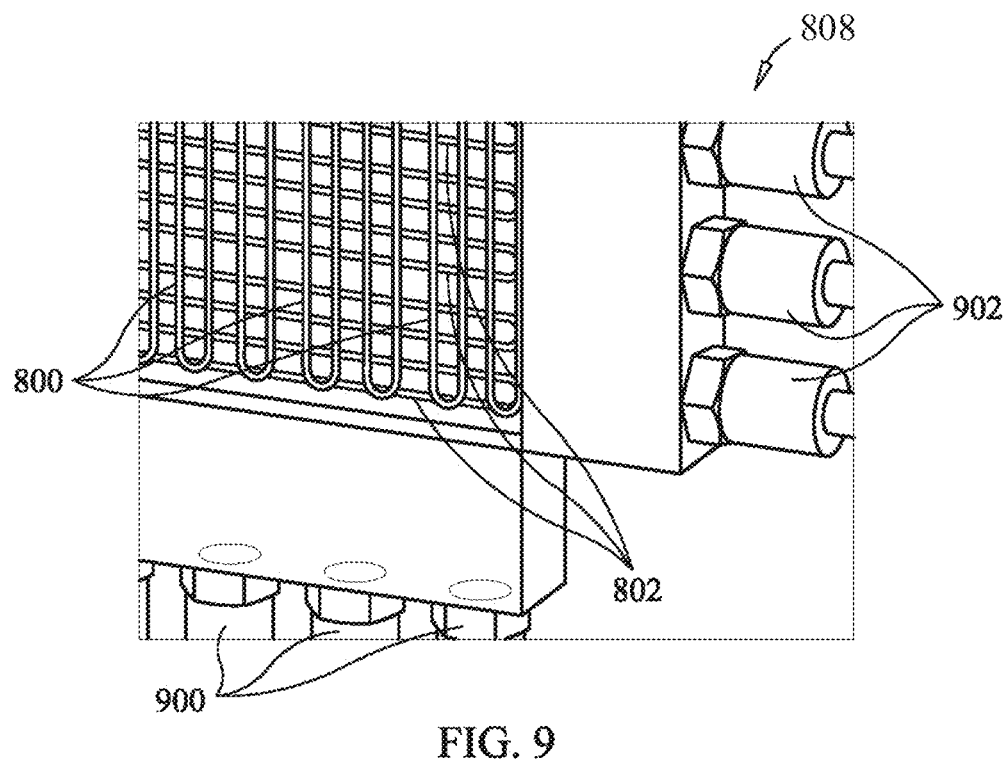
FIG. 9 is a partial front perspective view of an example of an implementation of oscillating heat pipes on the middle plate shown in FIGS. 4 and 8 in accordance with the present disclosure.

FIG. 9 is a partial front perspective view 808 of an example of an implementation of oscillating heat pipes on the middle plate 402 in accordance with the present disclosure. The partial front perspective view 808 shows an example of an implementation of the plurality of column probes 900 and plurality of row probes 902 along the middle plate 402. The first plurality of oscillating heat pipes 800 are arranged as vertical (i.e., columns) and the second plurality of oscillating heat pipes 802 are arranged as horizontal (i.e., rows).

Figure 10:
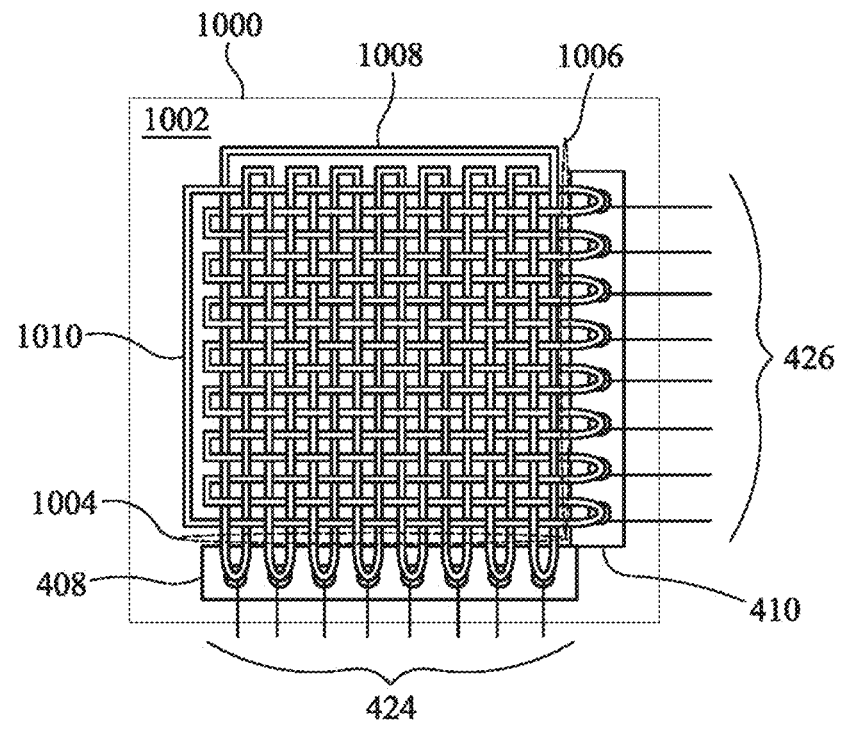
FIG. 10 is a front view of a system diagram of an example of another implementation of the oscillating heat pipes on a middle plate for use with the EPC of FIG. 4 in accordance with the present disclosure.

Turning to FIG. 10, a front view of a system diagram of an example of another implementation of oscillating heat pipes on a middle plate 1000 for use with the EPC is shown in accordance with the present disclosure. Similar to the example shown in relation to FIG. 8, in this example, the middle plate 1000 includes a front surface 1002 and the oscillating heat pipes include a first plurality of oscillating heat pipes 800 and a second plurality of oscillating heat pipes 802 that are oriented approximately orthogonal to the first plurality of oscillating heat pipes 800.

Additionally, the first plurality of oscillating heat pipes 1004 are shown to be part of a first multiple loop oscillating heat pipe 1008 and the second plurality of oscillating heat pipes 1006 are shown to be part of a second multiple loop oscillating heat pipe 1010. The plurality of column probes 408 are shown to be in physical contact and thermal communication with serpentine bends of each of the oscillating heat pipes of the first plurality of oscillating heat pipes 1004 and the plurality of row probes 410 are shown to be in physical contact and thermal communication with serpentine bends of each of the oscillating heat pipes of the second plurality of oscillating heat pipes 1006. In this example, each of the oscillating heat pipes of the first plurality of oscillating heat pipes 1004 are arranged as columns on the front surface 1002 of the middle plate 1000 and the each of the oscillating heat pipes of the second plurality of oscillating heat pipes 1006 are arranged as rows on the front surface 1002 of the middle plate 1000. Unlike the example described with regard to FIG. 8, in this example, the first plurality of oscillating heat pipes 1004 and a second plurality of oscillating heat pipes 1006 are interleaved on the front surface 1002 of the middle plate 1000.

Figure 11B:
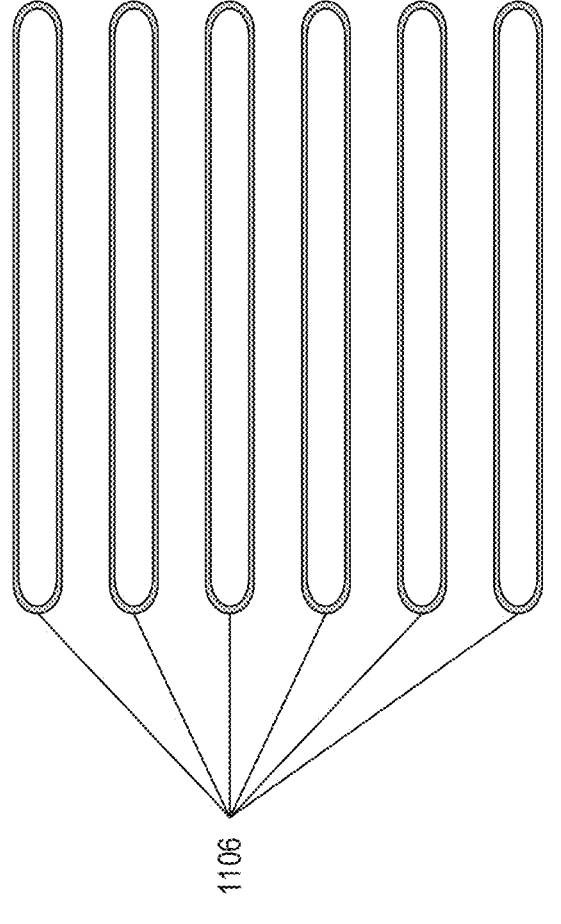
FIG. 11A-C are front views of a system diagram of an example of yet another implementation of oscillating heat pipes on a middle plate for use with the EPC of FIG. 4 in accordance with the present disclosure.
Figure 11A:
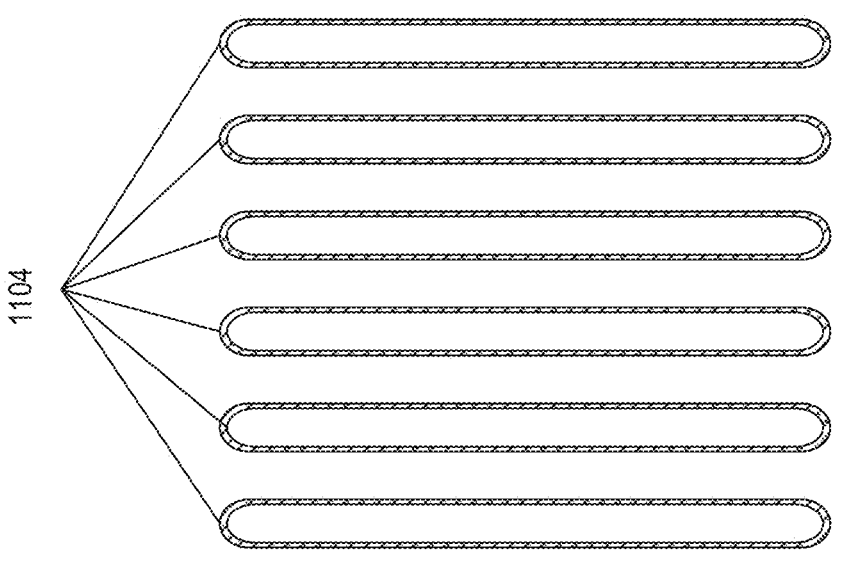
Figure 11C:
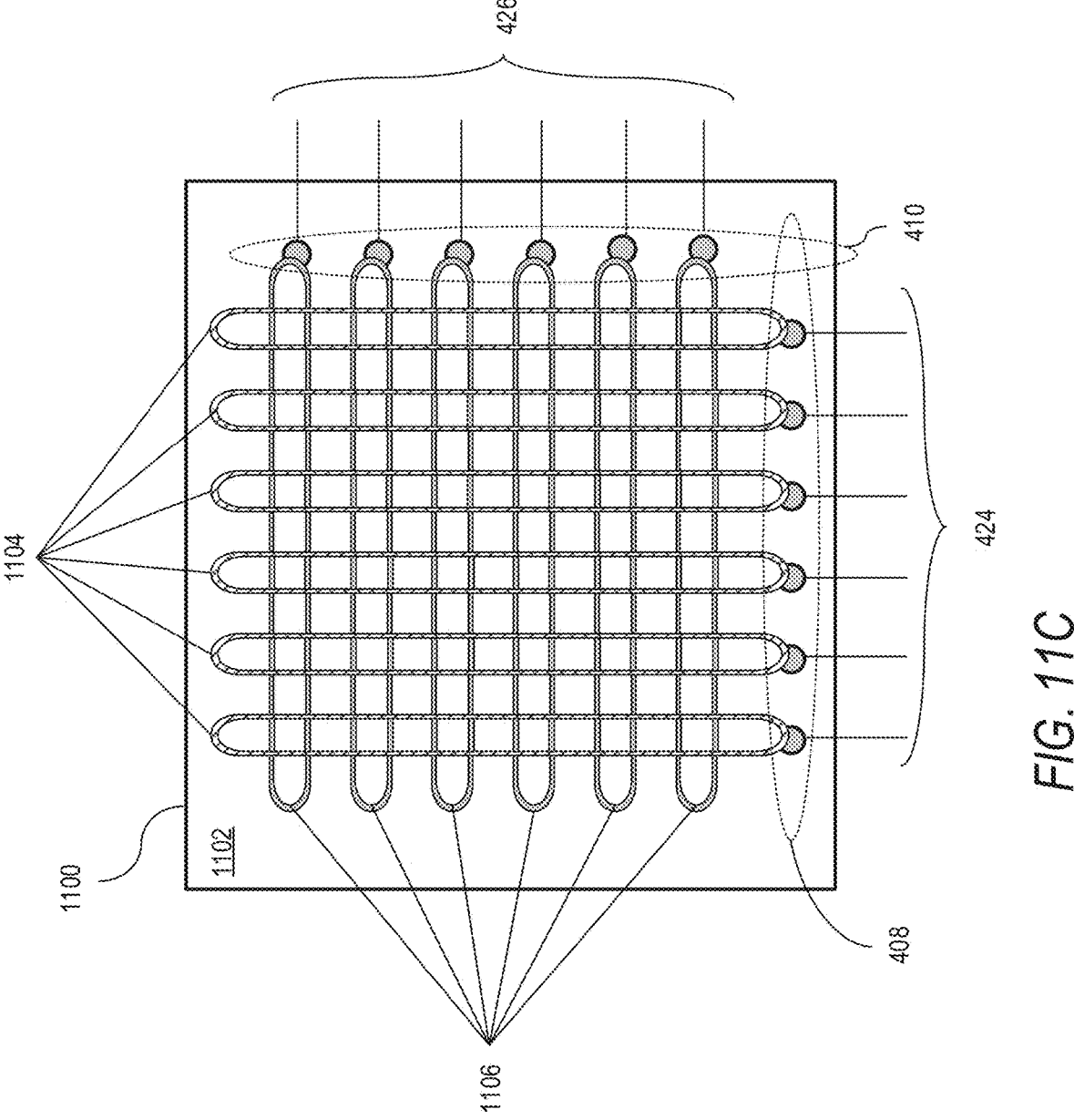

In FIGS. 11A-C, front views of a system diagram of an example of yet another implementation of oscillating heat pipes on a middle plate 1100 for use with the is shown in accordance with the present disclosure. As before, the middle plate 1100 includes a front surface 1102. However, in this example, the first plurality of oscillating heat pipes 1104 and second plurality of oscillating heat pipes 1106 consist of a plurality of discrete oscillating heat pipes, where the first plurality of oscillating heat pipes 1104 and a second plurality of oscillating heat pipes 1106 that are oriented approximately orthogonal to the first plurality of oscillating heat pipes 1104. The first plurality of oscillating heat pipes 1104 are shown in FIG. 11A as discrete oscillating heat pipes oriented as columns and the second plurality of oscillating heat pipes 1106 are shown in FIG. 11B as discrete oscillating heat pipes oriented as rows. In this example, the discrete oscillating heat pipes are channels. In FIG. 11C, the rows and columns of the discrete channels of the first plurality of oscillating heat pipes 1104 and the second plurality of oscillating heat pipes 1106 are shown on the front surface 1102 of the middle plate 1100.

Unlike the previous examples, in this example the plurality of column probes 408 are shown to be in physical contact and thermal communication with the bends of each of the discrete oscillating heat pipes of the first plurality of oscillating heat pipes 1104 and the plurality of row probes 410 are shown to be in physical contact and thermal communication with the bends of each of the discrete oscillating heat pipes of the second plurality of oscillating heat pipes 1106. In this example, each of the oscillating heat pipes of the first plurality of oscillating heat pipes 1004 are arranged as columns on the front surface 1102 of the middle plate 1100 and the each of the oscillating heat pipes of the second plurality of oscillating heat pipes 1106 are arranged as rows on the front surface 1102 of the middle plate 1100. In this example, second plurality of oscillating heat pipes 1106 are shown as located on the front surface 1102 of the middle plate 1100 below the first plurality of oscillating heat pipes 1104. However, it is appreciated that the arrangement optionally may be reversed such that the first plurality of oscillating heat pipes 1104 are located on the front surface 1102 of the middle plate 1100 below the second plurality of oscillating heat pipes 1106. Moreover, the first plurality of oscillating heat pipes 1104 and second plurality of oscillating heat pipes 1106 may be interleaved on the front surface 1102 of the middle plate 1100.

From these examples, it is appreciated that the EPC 100, 400 may be configured in different ways. As an example, regarding the examples described in relation to FIGS. 2 and 3, the first plurality of oscillating heat pipes 108 may be configured as discrete oscillating heat pipes similar to the first plurality of oscillating heat pipes 1104 shown and described in relation to FIG. 11A. Moreover, the second plurality of oscillating heat pipes 1106 may be configured as discrete oscillating heat pipes similar to the second plurality of oscillating heat pipes 1106 shown and described in relation to FIG. 11B.

Furthermore, with regard to the examples shown in relation to FIGS. 4, 8, and 11C, the first plurality of oscillating heat pipes and second plurality of oscillating heat pipes may be part of a single closed multiple loop oscillating heat pipe.

In all of these examples, the EPC 100, 400 may be manufactured utilizing three-dimensional additive manufacturing techniques.

Figure 12:
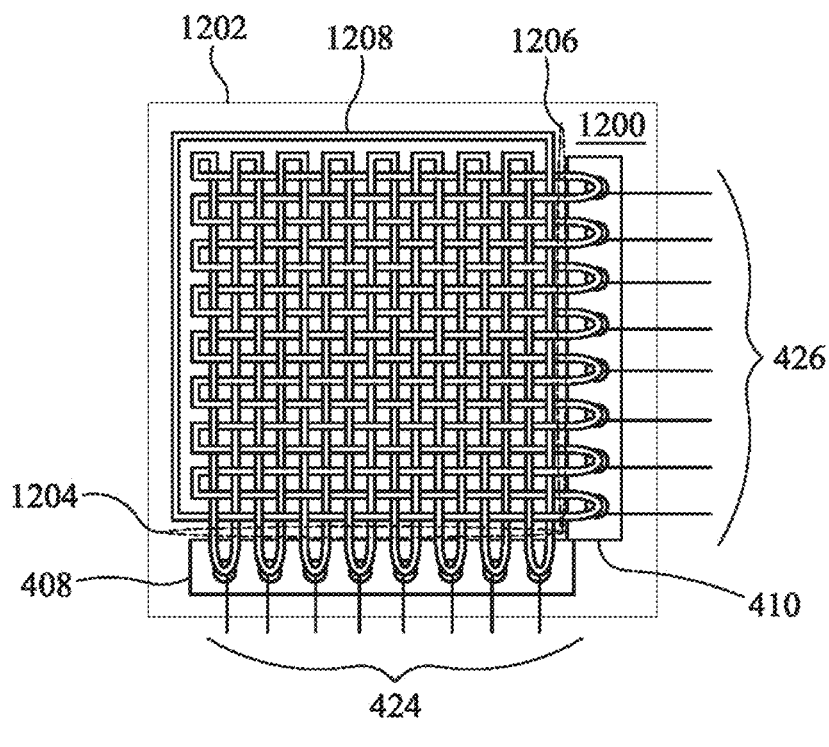
FIG. 12 is a front view of a system diagram of an example of yet another implementation of oscillating heat pipes on a middle plate for use with the EPC of FIG. 4 in accordance with the present disclosure.

Turning to FIG. 12, a front view of a system diagram of an example of yet another implementation of the oscillating heat pipes on the front surface 1200 of the middle plate 1202 for use with the EPC 400 in accordance with the present disclosure. In this example, the first plurality of oscillating heat pipes 1204 and second plurality of oscillating heat pipes 1206 are shown as being part of a single multiple loop oscillating heat pipe 1208. Similar to the examples shown in relation to FIGS. 8 and 10, in this example, the single multiple loop oscillating heat pipe 1208 includes the first plurality of oscillating heat pipes 1204 and the second plurality of oscillating heat pipes 1206 are oriented approximately orthogonal to each other.

Additionally, the plurality of column probes 408 are shown to be in physical contact and thermal communication with serpentine bends of each of the oscillating heat pipes of the first plurality of oscillating heat pipes 1204 and the plurality of row probes 410 are shown to be in physical contact and thermal communication with serpentine bends of each of the oscillating heat pipes of the second plurality of oscillating heat pipes 1206. In this example, each of the oscillating heat pipes of the first plurality of oscillating heat pipes 1204 are arranged as columns on the front surface 1200 of the middle plate 1202 and the each of the oscillating heat pipes of the second plurality of oscillating heat pipes 1206 are arranged as rows on the front surface 1200 of the middle plate 1202. Moreover, in this example, the first plurality of oscillating heat pipes 1204 and a second plurality of oscillating heat pipes 1206 are interleaved on the front surface 1200 of the middle plate 1202.

Figure 13A:
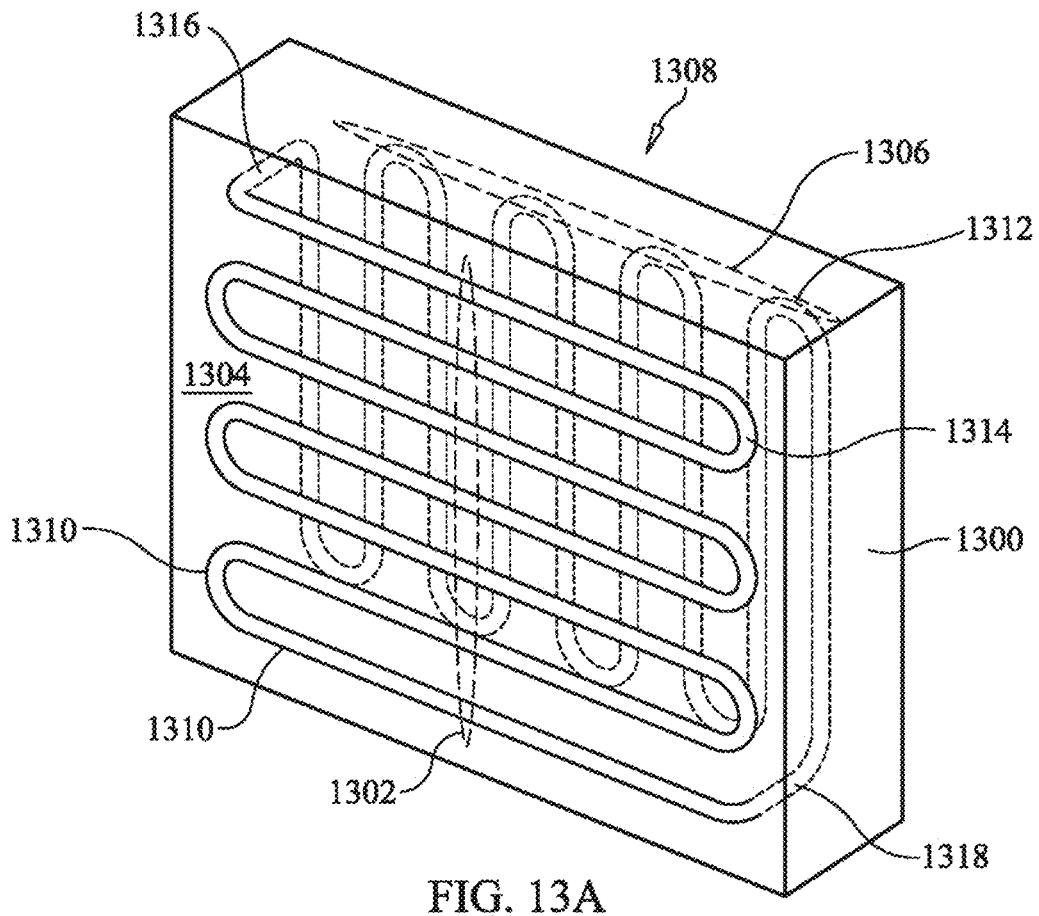
FIG. 13A is a front perspective view of a system diagram of an example of still another implementation of the oscillating heat pipes on a middle plate for use with the EPC of FIG. 4 in accordance with the present disclosure.
Figure 13B:
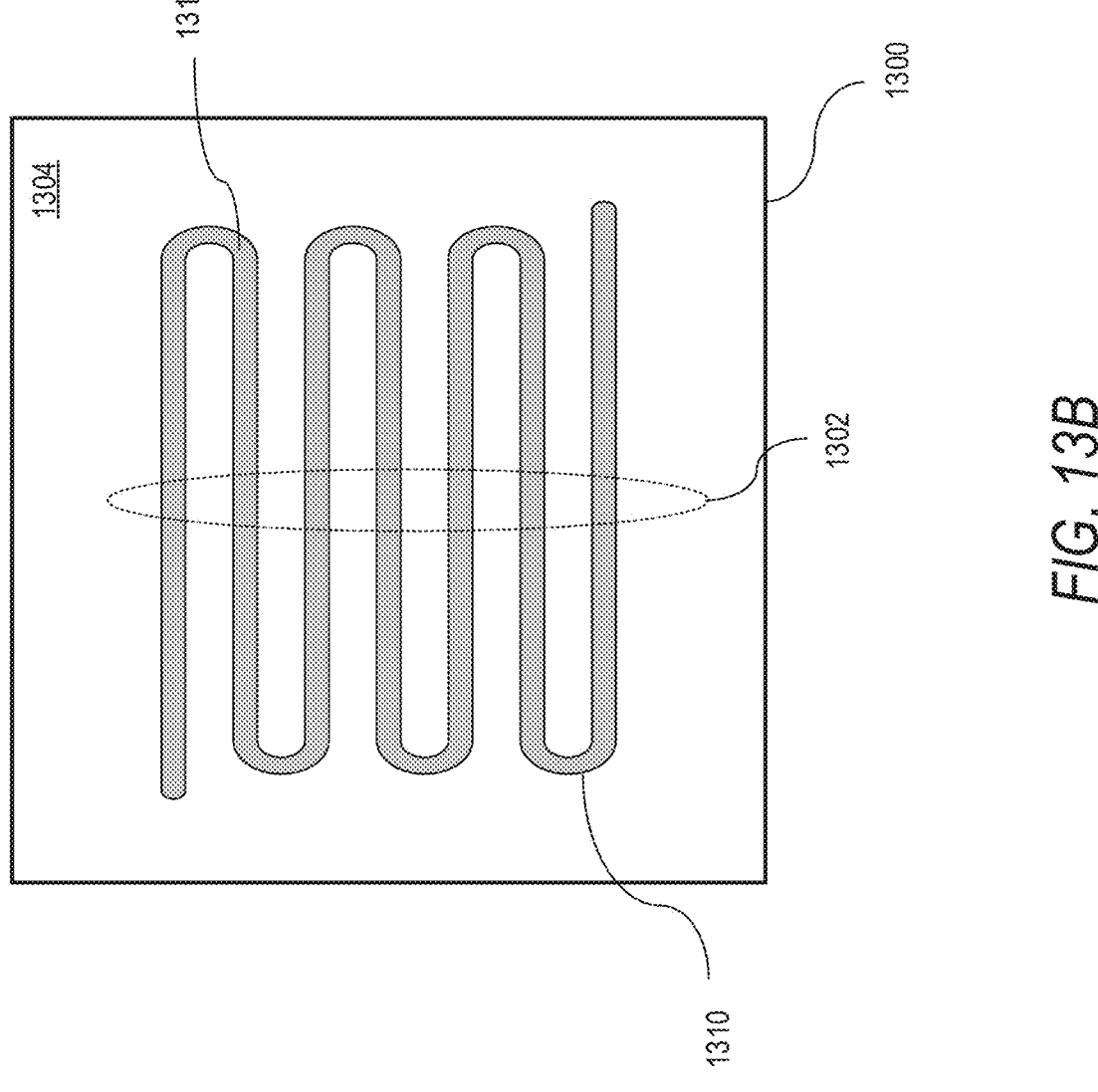
FIG. 13B is a front view of the implementation of the first plurality of oscillating heat pipes on the middle plate shown in FIG. 13A in accordance with the present disclosure.
Figure 13C:
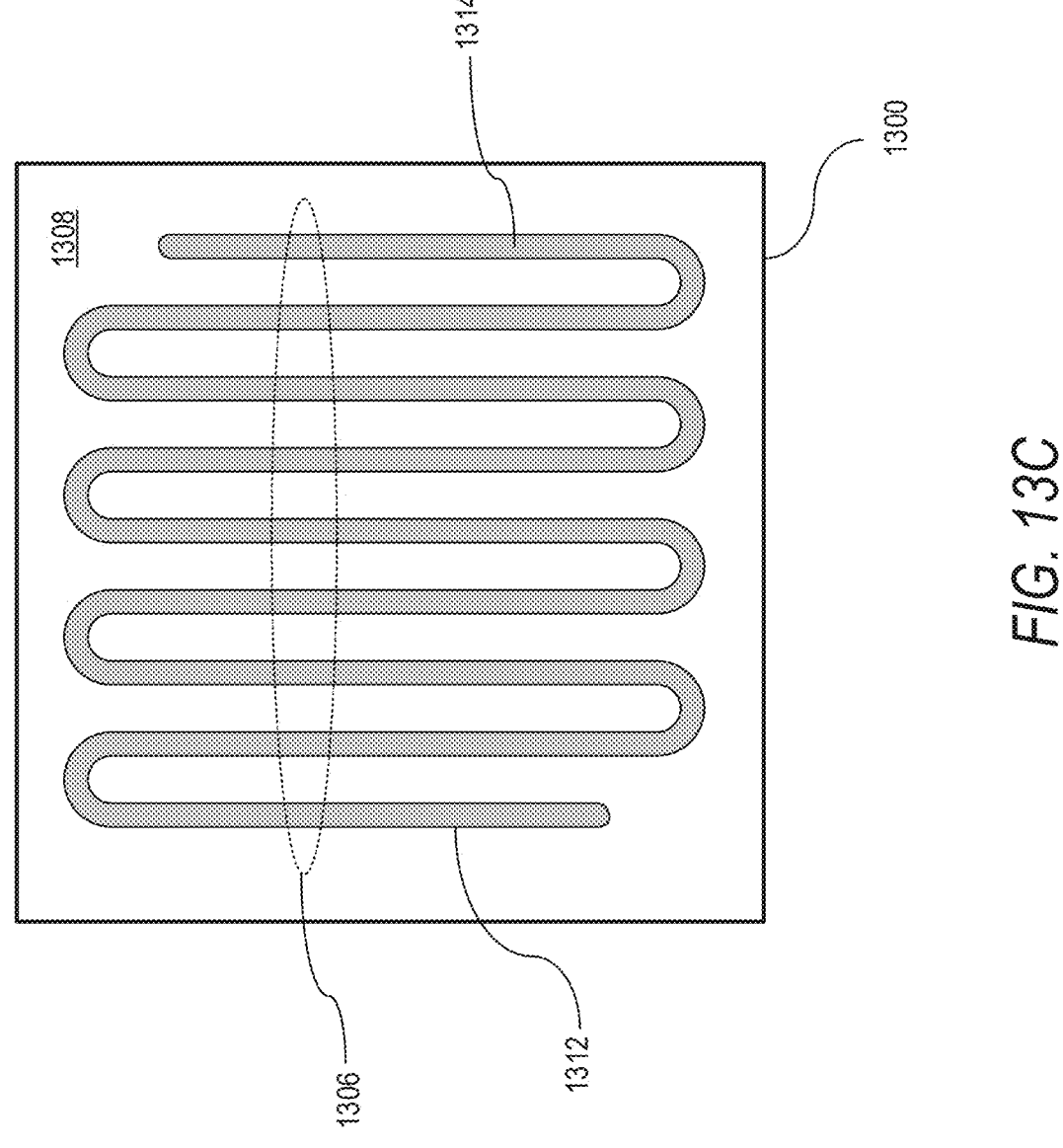
FIG. 13C is a back view of the implementation of the second plurality of oscillating heat pipes on the middle plate shown in FIG. 13A in accordance with the present disclosure.

In FIG. 13A, a front perspective view of a system diagram of an example of still another implementation of the oscillating heat pipes on the middle plate 1300 for use with the EPC 400 is shown in accordance with the present disclosure. FIG. 13B is a front view of the implementation of the first plurality of oscillating heat pipes 1302 on the front surface 1304 of the middle plate 1300 and FIG. 13C is a back view of the implementation of the second plurality of oscillating heat pipes 1306 on the middle plate 1300 in accordance with the present disclosure. In this example, the first plurality of oscillating heat pipes 1302 is arranged as rows on a front surface 1304 of the middle plate 1300 and the second plurality of oscillating heat pipes 1306 is arranged as columns on a back surface 1308 of the middle plate 1300. Additionally, in this example, the first plurality of oscillating heat pipes 1302 is part of a first multiple loop oscillating heat pipe 1310 and the second plurality of oscillating heat pipes 1306 is part of a second multiple loop oscillating heat pipe 1312. Moreover, the first multiple loop oscillating heat pipe 1310 and the second multiple loop oscillating heat pipe 1312 are part of a single multiple loop oscillating heat pipe 1314.

The single multiple loop oscillating heat pipe 1314 includes a first inter-surface tube connection 1316 and a second inter-surface tube connection 1318. In this example, the first inter-surface tube connection 1316 and second inter-surface tube connection 1318 are tubes that fluidly connect the first multiple loop oscillating heat pipe 1310 on the front surface 1304 to the second multiple loop oscillating heat pipe 1312 on the back surface 1308 of the middle plate 1300.

Alternatively, the first plurality of oscillating heat pipes 1302 may be arranged as columns on the front surface 1304 of the middle plate 1300 and the second plurality of oscillating heat pipes 1306 may be arranged as rows on the back surface 1308 of the middle plate 1300. Moreover, as another alternative, the first plurality of oscillating heat pipes 1302 may be arranged as columns on the back surface 1308 of the middle plate 1300 and the second plurality of oscillating heat pipes 1306 may be arranged as rows on the front surface 1304 of the middle plate 1300.

Figure 14:
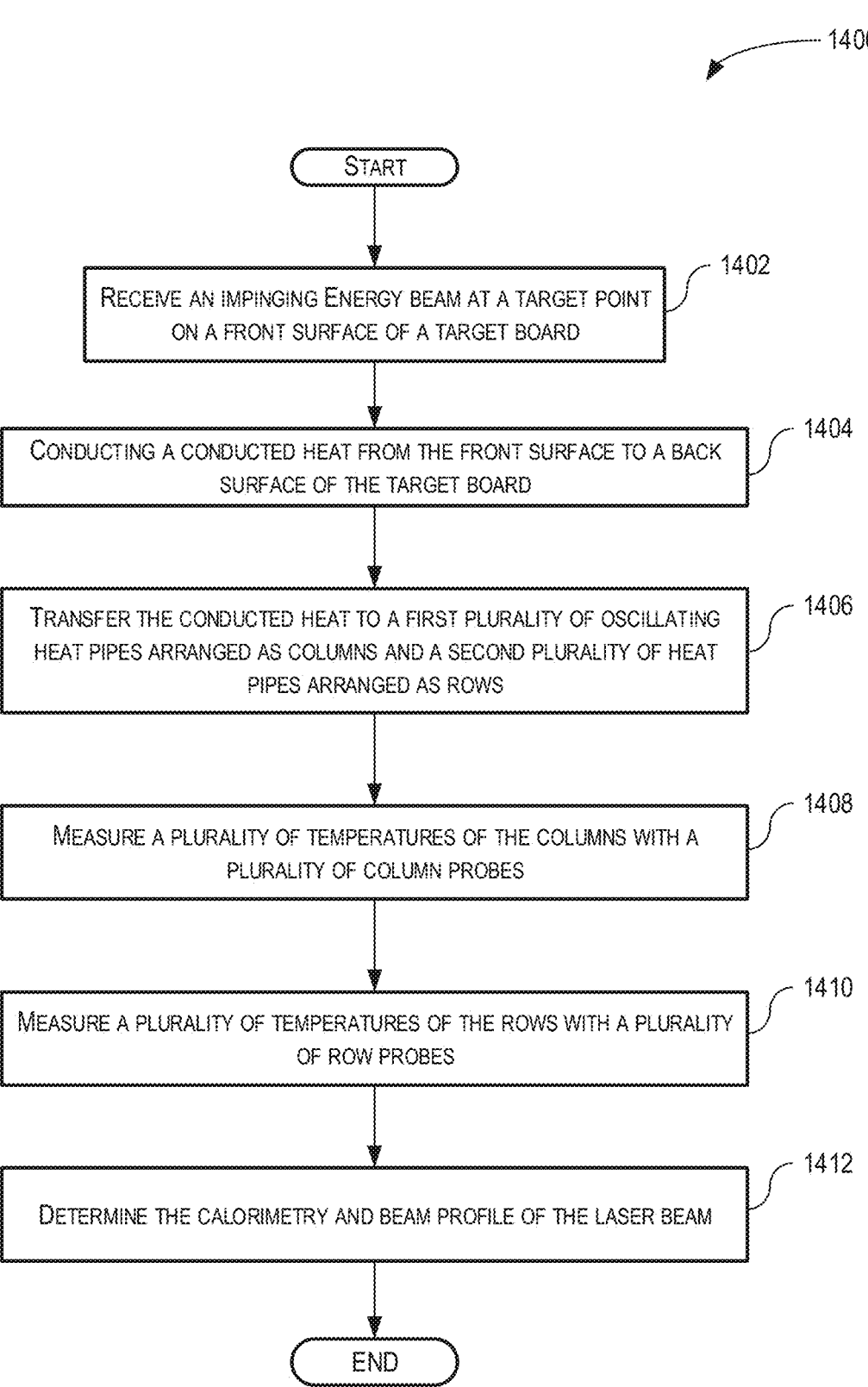
FIG. 14 is a flowchart of an example of an implementation of method performed by the EPC shown in FIGS. 1 and 4 in accordance with the present disclosure.

FIG. 14 is a flowchart of an example of an implementation of method performed by the EPC shown in FIGS. 1 and 4 in accordance with the present disclosure. In this example, the method 1400 starts by receiving 1402 an impinging energy beam 126 at the target point 304, 418 on the front surface 104 of the target board 102 which produces heat at the target point 304, 418. In response, conducting 1404 the heat from the received energy beam at the target point 304, 418 as conducted heat 116 through the target board 102 to the back surface 106 of the target board 102. The method 1400 then transfers 1406 the conducted heat 116 to the first plurality of oscillating heat pipes 108, 800 and the second plurality of oscillating heat pipes 112, 802, where the first plurality of oscillating heat pipes 108, 800 are arranged as columns and the second plurality of oscillating heat pipes 112, 802 are arranged as rows. The method 1400 then measures 1408, 1410 a plurality of temperatures of the columns with the plurality of column probes 122, 408 and a plurality of temperatures of the rows with the plurality of row probes 124, 410. The method 1400 then determines 1412 the calorimetry and beam profile of the energy beam 126 and the method 1400 ends.

Figures 15A, 15B:
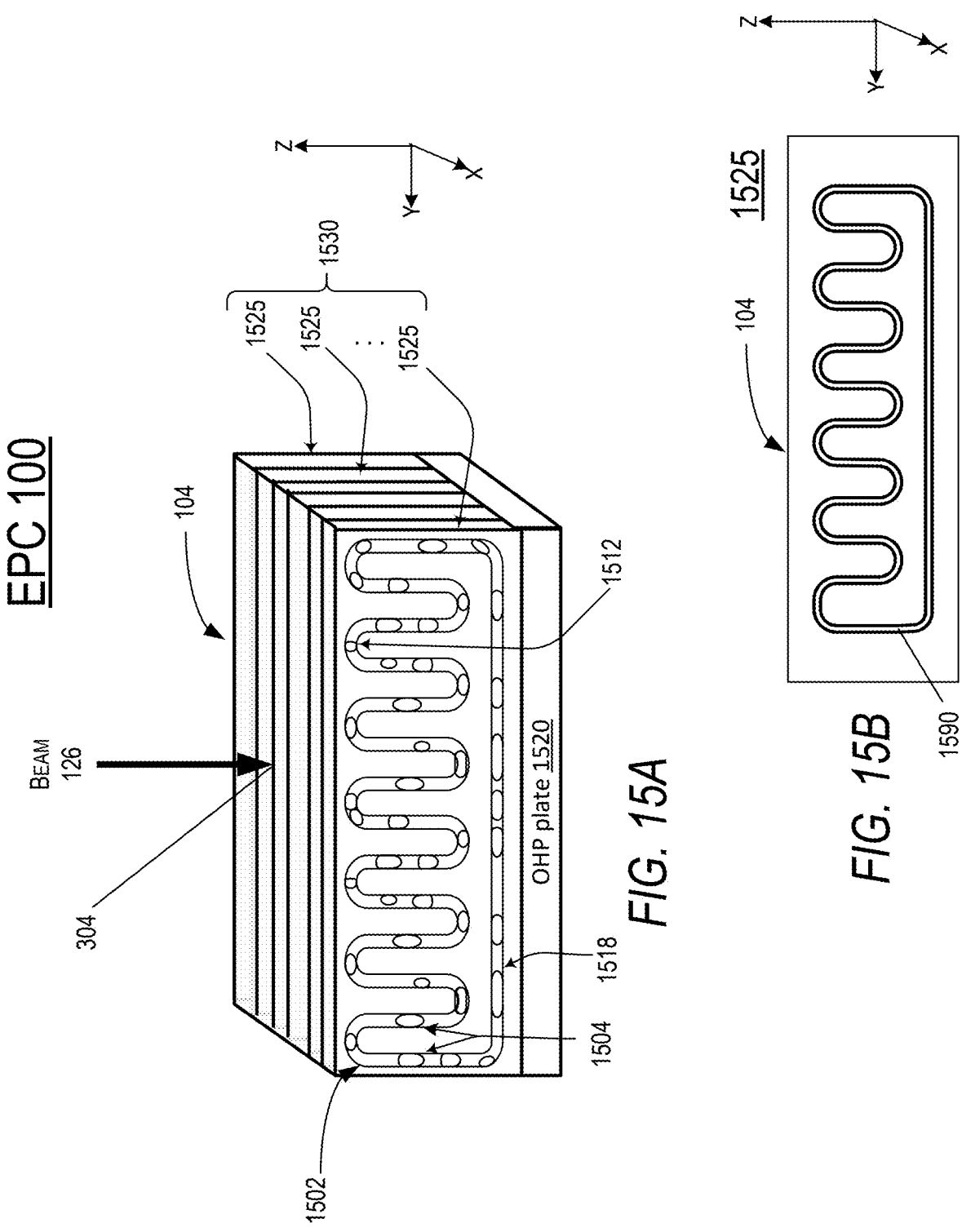
FIG. 15A is a perspective view of an EPC in accordance with the present disclosure.
FIG. 15B is a plan view of a blade with a groove forming part of an oscillating heat pipe in the EPC of FIG. 15A in accordance with the present disclosure.

FIG. 15A is a perspective view of another EPC 100 with OHP 1502 oriented to quickly conduct heat away from target surface 104. The "target surface" is a surface receiving the energy beam 126. Target surface 104 is a surface of body 1530, made in some embodiments as a stack of blades 1525, and containing and/or supporting one or more OHPs 1502. Only one OHP is shown in FIG. 15A.

Each OHP 1502 has capillary tubes 1504 extending away from target surface 104, i.e. non-parallel to target surface 104. In the view of FIG. 15A, target surface 104 is substantially horizontal, i.e. extending along the X-Y plane, though the target surface may be texture as described below. OHP tubes 1504 are straight vertical tubes (parallel to the Z axis), but other geometries and EPC and OHP orientations are also possible. OHP 1502 is similar to OHP 600 of FIG. 6, but other OHP geometries are possible, including the geometries discussed above in connection with FIGS. 1-13C and other geometries.

The energy received from beam 126 and absorbed at target surface 104 is conducted as heat by body 1530 (possibly made of aluminum or other suitable metal or non-metal material) to reach OHPs 1502 having turns 1512 positioned a short distance (e.g. a few millimeters) under target surface 104. OHPs 1502 transfer the heat downward to OHP condenser sections, e.g. to bottom horizontal tubes 1518 in the example of FIG. 15A. From thence, the heat energy is conducted to the bottom surface of body 1530, which can be attached to another heat spreader 1520, possibly a horizontal plate with one or more OHPs (not shown) spreading the heat in the X-Y plane, possibly along the X and/or Y axes. Suitable OHPs may have the same geometry as OHP 1502 (multiple turns at the evaporator side and a straight tube like 1518 at the condenser side) or some other geometry discussed above in connection with FIGS. 1-13A or other geometry. These horizontal OHPs help spread the heat horizontally ("radially" with respect to beam 126) away from target point 304 at which the beam 126 strikes target surface 104. The damage threshold can be significantly increased due to fast downward ("axial") and then radial heat transfer provided by OHPs 1502 and horizontal plate 1502.

Body 1530 is formed by stacked blades (thin plates) 1525 each of which may include and/or support a separate OHP 1502. FIG. 15B illustrates a plan view of a major surface of a blade 1525 (the major surfaces are the largest surfaces, parallel to the Y-Z plane in the views of FIGS. 15A, 15B). OHPs 1502 can be formed by grooves 1590 formed in major surfaces of blades 1525. When blades 1525 are stacked together, the groove 1590 in each major surface matches the groove in the adjacent surface to form the capillary tubes. The adjacent blades 1525 are bonded to each other, e.g. by brazing, to form body 1530. OHPs 1502 are then filled with suitable working liquid through ports (not shown) connecting the pipes 1502 to the exterior of body 1530. The ports are then hermetically sealed using known techniques.

Then horizontal plate 1520 is attached to the bottom as needed. Other fabrication techniques are possible, including those known in the art.

Figures 16, 17:
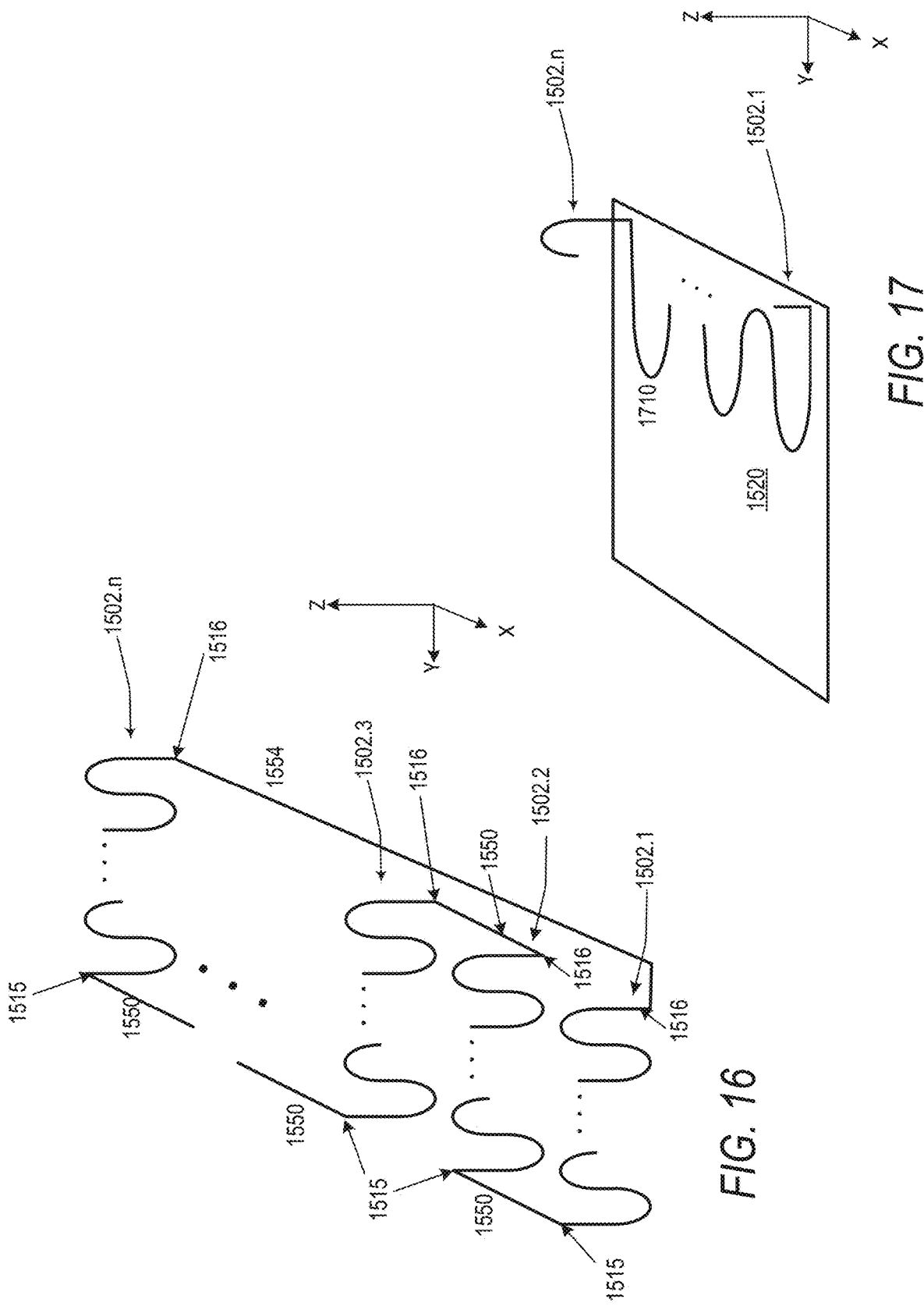
FIG. 16 is a line diagram of an example of an implementation of a single loop oscillating heat pipe in accordance with the present disclosure.
FIG. 17 is a diagram of another example of an implementation of a single loop oscillating heat pipe in accordance with the present disclosure.

In some implementations, multiple tubes 1502, supported by different blades 1525, are joined to form a single closed-loop OHP, similar to FIG. 13A. For example, FIG. 16 illustrates an OHP having n tubes 1502.1 through 1502.n (shown as thin lines), where n is an integer greater than 1. Each of these tubes 1502.i (i=1, 2, . . . , n) is similar to the meandering tube of OHP 1502 of FIG. 15A; the horizontal tube 1518 is omitted. Each tube 1520.i extends from its left end 1515 to its right end 1516. In this example, tube ends 1515 are at the top (in the evaporator, near target surface 104) rather than the bottom as in FIG. 15A. The right ends 1516 are at the bottom as in FIG. 15A. (In other implementations, any of the left or right ends 1515, 1516 can be at the top or bottom.) In FIG. 16, at the right or left ends 1515 and 1516, each tube 1502.i is connected to an adjacent tube 1502.i by a horizontal tube 1550 (e.g. parallel to the X axis) formed by or through suitable holes in blades 1525. Thus, tube 1502.1 is connected to tube 1502.2 at ends 1515. Tubes 1502.2 and 1502.3 are interconnected at ends 1516. And so on. An exception is the first and last tubes 1502.1, 1502.n, whose bottom right ends 1516 are interconnected by horizontal tube 1554 to form a closed loop.

In the example of FIG. 17, tube 1554 is omitted, and is replaced by tube 1710 in horizontal plate 1520. In this way, the OHPs 1520 and OHP 1710 in plate 1520 are merged into a single closed-loop OHP. In the example of FIG. 17, tube 1710 is shaped like tubes 1520.i, but is oriented to spread the heat in the Y-axis. Other designs and geometries are also possible.

Figure 18:
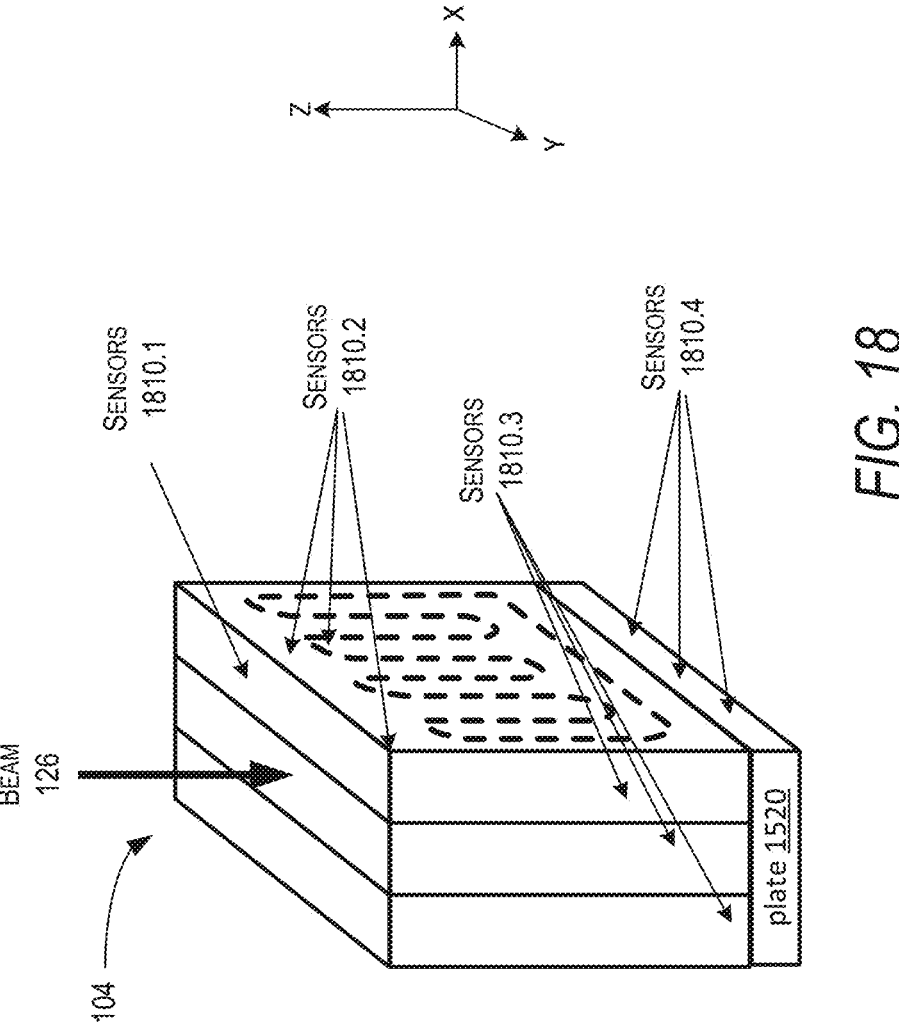
FIGS. 18 and 19 are perspective views showing sensor positioning in an EPC in accordance with the present disclosure.

FIG. 18 illustrates exemplary positioning of sensors used to determine the beam profile. Appropriate sensor types and positions depend on the spatial and temporal beam profiling requirements. Sensors can be used to directly sample the beam 126 (e.g. photodiodes or other optical sensors in the path of beam 126) or indirectly sample the beam or effect of the beam on the calorimeter (e.g. thermal sensors).

Sensors or arrays of sensors can be attached to EPC surfaces, e.g. target surface 104 (as shown at 1810.1) or other surfaces. Sensors can also be imbedded into or behind the structure (1810.2) and/or embedded into or placed onto the edges near the capillary tubes (1810.3, 1810.4).

Possible sensor types include optical sensors (e.g. photodiodes, CCD or other cameras, and others), thermistors (e.g. with a Negative Temperature Coefficient (NTC)), other resistance-type sensors (e.g. Resistance Temperature Detectors (RTD)), thermocouples, and/or semiconductor-based temperature sensors, and/or other types.

Figure 19:
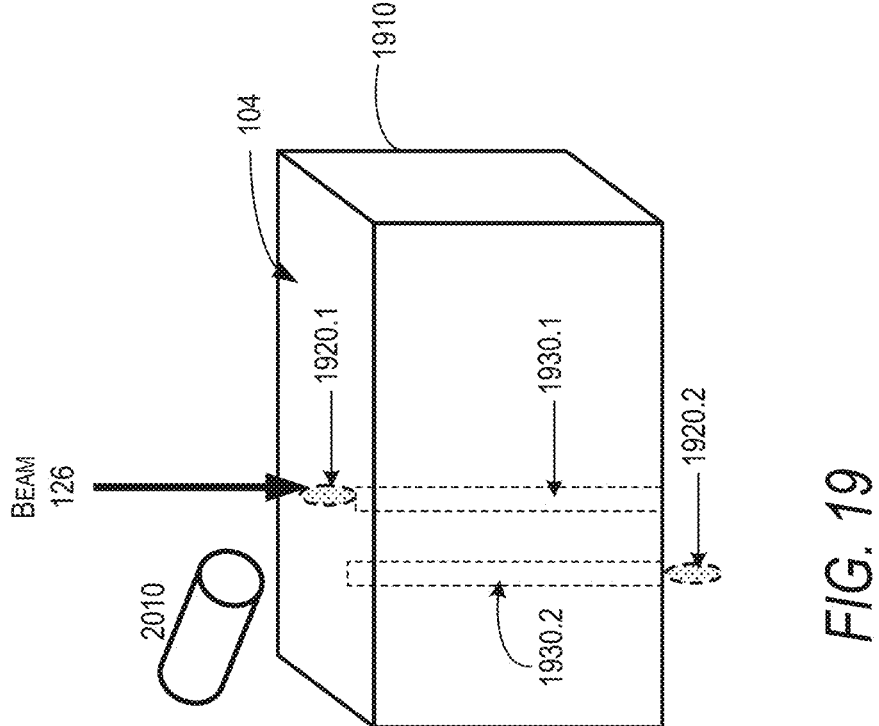

FIG. 19 illustrates exemplary sensor positioning relative to EPC body 1910. Body 1910 may represent body 1530 with or without plate 1520 of FIG. 15A. Sensor 1920.1 is attached to target surface 104. This can be a photodiode or some other optical sensor, or a thermistor, or RTD, or a thermocouple, or some other type described above. Sensor 1920.1 is connected to signal processing circuitry (not shown in FIG. 19, possibly such as controller 138 described above) by one or more wires, not shown, passing through a through hole 1930.1. The signal processing circuitry uses the sensors' signals to determine the spatial intensity profile of energy beam 126.

Sensor 1920.2, which may be an optical or thermal sensor or some other sensor type as described above, is positioned below body 1910, possibly attached to the bottom surface of body 1910. Through hole 1930.2 serves as a waveguide, or to house a waveguide, guiding radiation from beam 126 to sensor 1920.2 when the beam overlaps the hole 1930.2. Other such sensors can be attached to the bottom surface of body 1530 (FIG. 15A) and/or top surface of plate 1520, and/or bottom surface of plate 1520, and can be connected to the signal processing circuitry via holes (not shown) in body 1530 and/or plate 1520. The number, density, and types of sensors depend on the beam size or other requirements as noted above. In some embodiments, the sensors are positioned so that the beam 126 is always detected by multiple optical sensors 1920 (1920.1 and/or 1920.2) and/or other types of sensors whenever the beam strikes target surface 104.

The sensor system may include one or more cameras or other optical sensors 2010 possibly spaced from target surface 104 or EPC body 1910, and arranged to indirectly sense the energy of beam 126. Thus, sensors 2010 may include optical-based thermal sensors. For example, a camera 2010 may be a blackbody radiation sensor sensing the energy of thermal radiation frequencies emitted by target surface 104.

Sensors 2010 may include fluorescence-based sensors. Target surface 104 may be covered by a fluorescent coating, and camera 2010 may sense the energy of fluorescent radiation emitted by the coating in response to beam 126.

Sensors 1920 (1920.1, 1920.2) and 2010 may include interferometric sensors to measure the target surface height as it is affected by beam 126.

Sensors 1920.1 and/or 1920.2 may include fiber Bragg grating sensors, each of which is formed in a fiber optic cable to reflect a temperature-dependent frequency of broadband radiation incident on the sensor. The reflected radiation is detected by sensor 2010 as a temperature measurement at the sensor location.

Sensors 1920 and 2010 may include distributed temperature sensors.

EPC 100 may include multiple sensors of the same type, and may include combinations of sensors of different types described above in connection with FIGS. 18 and 19.

Techniques will now be discussed on increasing the absorptance of target surface 104. In some implementations, target surface 104 is coated with an absorbing material to increase absorption of energy of beam 126.

Alternatively or in addition, target surface 104 can be textured, e.g. with V-shaped grooves, to increase the surface area of target point 304 and thus reduce the energy intensity of beam 126 per unit area of surface 104. Target surface 104 can be machined to form the V-shaped grooves. However, it is desirable to make the bottom angle of the V-groove as sharp as possible in order to reduce reflection of beam 126. It may be difficult to create a sharp angle by machining.

Figures 20, 21:
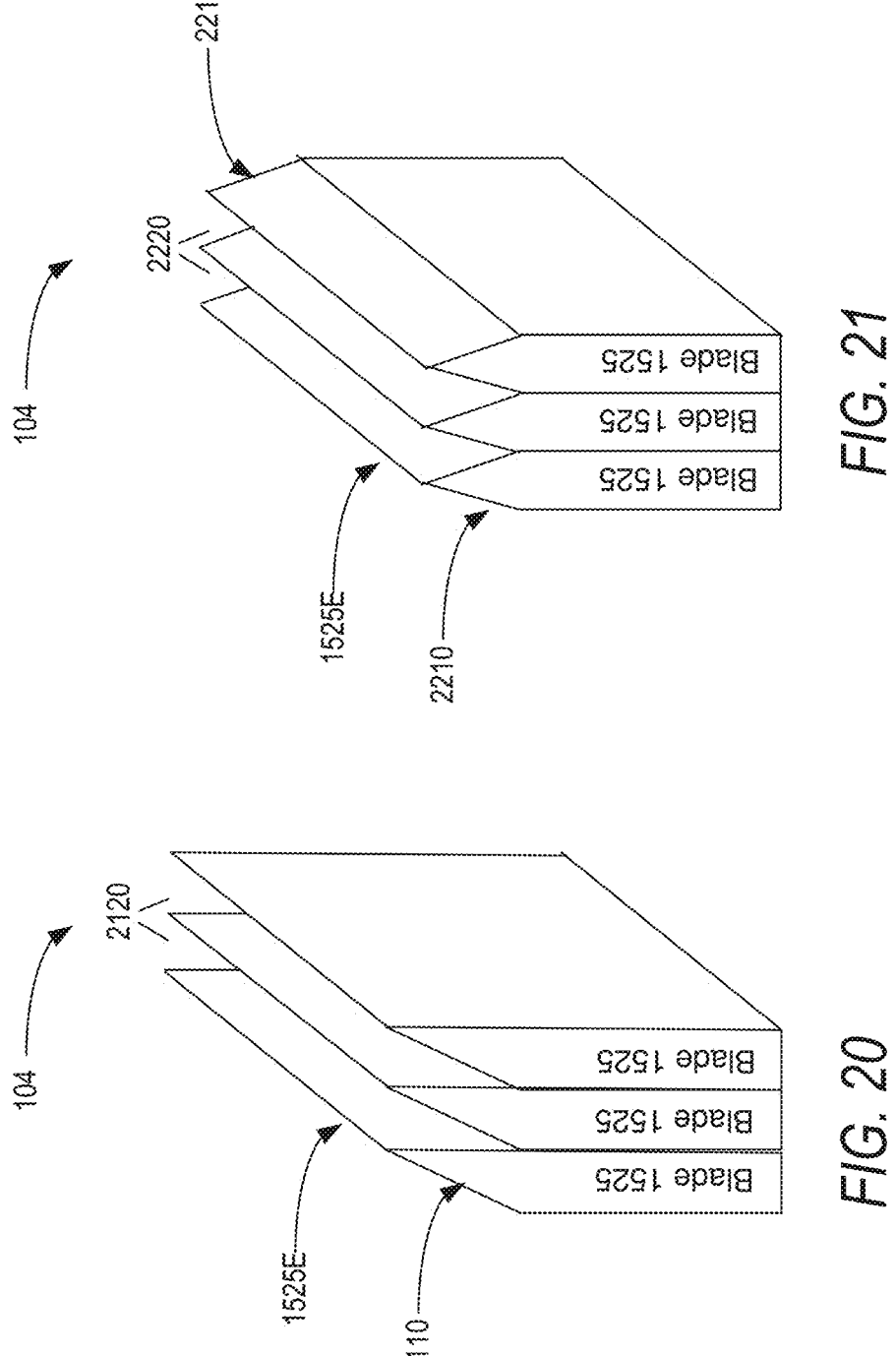
FIGS. 20 and 21 are perspective views illustrating target surface texturing in accordance with the present disclosure.

FIGS. 20 and 21 illustrate sharp angle formation without machining. Each blade 1525 is formed to have a tapered edge 1525E. In FIG. 20, the tapered edge 1525E is formed by inclined surface portion 2110 at the edge of one of the two major surfaces of each blade 1525. The inclined surface portion 2110 meets the opposite major surface in each blade. The opposite major surface is planar and does not have an inclined portion.

In FIG. 21, inclined surface portion 2210 is provided at each of the two major surfaces of each blade 1525. The inclined surface portions 2210 of each blade meet each other. When the blades 1525 are later stacked together, the inclined surface portions provide V-shaped grooves 2120 (FIG. 20) or 2220 (FIG. 21) between the adjacent blades 1525. In FIG. 20, groove 2120 is formed by the inclined surface portion 2110 of one of the blades and the non-inclined surface of an adjacent blade. In FIG. 21, groove 2220 is formed by inclined surface portions 2210 of adjacent blades 1525. The angles at the bottom of each groove are sharp. An exemplary angle is 60°, and exemplary height of each groove is 1 mm. Other dimensions are possible.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. An energy beam profiler and calorimeter (EPC) comprising: a target surface (e.g. target surface 104 of FIG. 15A, or target board front surface 104 of FIG. 1) configured to receive an impinging energy beam to be profiled by the EPC and generate heat in response to the energy beam; and one or more first oscillating heat pipes (OHPs) arranged to transfer the heat away from a location (e.g. 304) at which the impinging energy beam strikes the target surface of the EPC.

Clause 2. The EPC of clause 1 wherein each first OHP comprises an evaporator adjacent to the target surface and a condenser located farther from the target surface than the evaporator.

Clause 3. The EPC of clause 2, wherein in each first OHP, the condenser and the evaporator are interconnected by capillary tubes perpendicular to the target surface. While the target surface may be textured, "perpendicular" means perpendicular to the general extent of the target surface, rather than to each textured feature. For example, in FIGS. 20 and 21, the target surface is generally horizontal. Further, the target surface does not have to be generally flat; a tube is "perpendicular" to the target surface if the imaginary straight line passing through the tube intersects the target surface at a 90° angle at the point of intersection.

Clause 4. The EPC of any one or more of clauses 1, 2, 3, wherein each first OHP comprises first capillary tubes running at an angle to the target surface.

Clause 5. The EPC of any one or more of clauses 1 to 4 wherein each first OHP comprises first capillary tubes perpendicular to the target surface.

Clause 6. The EPC of clause 2 wherein the EPC comprises a stack of first plates (e.g. blades 1525) each of which extends at an angle to the target surface, each first plate supporting at least part of an evaporator and at least part of a condenser of a corresponding at least one first OHP.

Clause 7. The EPC of clause 6 wherein each of the first plates comprises a groove (such as 1590) extending along an entire length of the corresponding at least one first OHP and supporting the entire length of the corresponding at least one first OHP.

Clause 8. The EPC of clause 6, wherein for each of the first plates, the corresponding at least one first OHP is a common closed-loop OHP shared by all the first plates.

Clause 9. The EPC of any one or more of clauses 6 to 8, wherein each first plate has two major surfaces and a tapered edge, wherein the tapered edges of the first plates form the target surface, each pair of adjacent tapered edges forming a groove therebetween.

Clause 10. The EPC of any one or more of clauses 2 to 9 further comprising one or more second OHPs running substantially parallel to the target surface and thermally coupled to the one or more first OHPs, the one or more first OHPs being located between the one or more second OHPs and the target surface.

Clause 11. The EPC of any one or more of clauses 1 to 10 wherein the one or more first OHPs are a single closed-loop OHP comprising: a first part extending at an angle to the target surface; and a second part parallel to the target surface, the first part being positioned between the second part and the target surface.

Clause 12. An energy beam profiler and calorimeter (EPC) comprising: a stack of first plates each of which has two major surfaces and a tapered edge, wherein the tapered edges of the first plates form a target surface configured to receive an imping- ing energy beam, each pair of adjacent tapered edges form- ing a groove therebetween.

Clause 13. The EPC of clause 12, further comprising one or more first oscillating heat pipes (OHPs) positioned within the stack and configured to spread heat generated by absorp- tion of energy of the impinging beam at the target surface.

Clause 14. The EPC of clause 13, wherein the one or more OHPs are configured to spread the heat in a direction away from the target surface.

Clause 15. The EPC of any one or more of clauses 12 and 13, wherein each of the OHPs comprises capillary tubes running away from the target surface.

Clause 16. A method for measuring a calorimetry and beam profile with an energy beam profiler and calorimeter (EPC), the method comprising: absorbing an energy beam at a target surface of the EPC to generate heat; and spreading the heat by one or more first oscillating heat pipes (OHPs) adjacent to the target surface of the EPC.

Clause 17. The method of clause 16, wherein the EPC is configured to guide energy obtained from the energy beam to one or more sensors configured to measure the energy obtained from the energy beam.

Clause 18. The method of any one or more of clauses 16 and 17, wherein each first OHP comprises an evaporator adjacent to the target surface and a condenser located farther from the target surface than the evaporator, and spreading the heat comprises transferring the heat from the evaporator to the condenser.

Clause 19. The method of clause 18, wherein in each first OHP, the condenser and the evaporator are interconnected by capillary tubes perpendicular to the target surface.

Clause 20. The method of any one or more of clauses 16 to 19 wherein each first OHP comprises first capillary tubes perpendicular to the target surface.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, ele- ments and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunc- tive language such as the phrase "at least one of X, Y or Z," unless specifically stated otherwise, is to be understood to present that an item, term, etc. may be either X, Y, or Z, or a combination thereof.

What is claimed is:

1. An energy beam profiler and calorimeter (EPC) com- prising:
a target surface configured to receive an impinging energy beam to be profiled by the EPC and generate heat in response to the impinging energy beam; and
a stack of first plates comprising one or more first oscil- lating heat pipes (OHPs) arranged to transfer the heat away from a location at which the impinging energy beam strikes the target surface of the EPC, wherein each first plate of the stack of first plates comprises two respective major surfaces perpendicular to the target surface.

2. The EPC of claim 1, wherein each first OHP, of the one or more first OHPs, comprises an evaporator adjacent to the target surface and a condenser located farther from the target surface than the evaporator.

3. The EPC of claim 2, wherein, in each first OHP of the one or more first OHPs, the condenser and the evaporator are interconnected by capillary tubes perpendicular to the target surface.

4. The EPC of claim 2, wherein: each first plate, of the stack of first plates, extends at an angle to the target surface, and
each first plate, of the stack of first plates, supports at least part of an evaporator and at least part of a condenser of a corresponding at least one first OHP of the one or more first OHPs.

5. The EPC of claim 4, wherein each first plate, of the stack of first plates, comprises a groove extending along an entire length of the corresponding at least one first OHP and supporting the entire length of the corresponding at least one first OHP.

6. The EPC of claim 4, wherein, for each first plate of the stack of first plates, the corresponding at least one first OHP is a common closed-loop OHP shared by the stack of first plates.

7. The EPC of claim 4, wherein each first plate, of the stack of first plates, has a respective tapered edge, and wherein tapered edges of the stack of first plates form the target surface, each pair of adjacent tapered edges forming a groove therebe- tween.

8. The EPC of claim 2, further comprising one or more second OHPs running substantially parallel to the target surface and thermally coupled to the one or more first OHPs, the one or more first OHPs being located between the one or more second OHPs and the target surface.

9. The EPC of claim 1, wherein each first OHP, of the one or more first OHPs, comprises first capillary tubes running at an angle to the target surface.

10. The EPC of claim 9, wherein the one or more first OHPs are a single closed-loop OHP comprising:
a first part extending at an angle to the target surface; and
a second part parallel to the target surface, the first part being positioned between the second part and the target surface.

11. The EPC of claim 1, wherein each first OHP, of the one or more first OHPs, comprises first capillary tubes perpendicular to the target surface.

12. An energy beam profiler and calorimeter (EPC) comprising:

a stack of first plates, each first plate comprising two respective major surfaces and a respective tapered edge, wherein:

the tapered edges of the first plates form a target surface configured to receive an impinging energy beam, each pair of adjacent tapered edges forming a groove therebetween; and for each first plate of the stack of first plates, the two respective major surfaces are perpendicular to the target surface.

13. The EPC of claim 12, further comprising one or more first oscillating heat pipes (OHPs) positioned within the stack of first plates and configured to spread heat generated by absorption of energy of the impinging energy beam at the target surface.

14. The EPC of claim 13, wherein each first OHP, of the one or more first OHPs, comprises respective capillary tubes running away from the target surface.

15. The EPC of claim 13, wherein the one or more first OHPs are configured to spread the heat in a direction away from the target surface.

16. A method for measuring a calorimetry and beam profile with an energy beam profiler and calorimeter (EPC), the method comprising:

absorbing an energy beam at a target surface of the EPC to generate heat; and spreading the heat by one or more first oscillating heat pipes (OHPs) adjacent to the target surface of the EPC, wherein:

the one or more first OHPs are positioned within a stack of first plates, and each first plate of the stack of first plates comprises two respective major surfaces perpendicular to the target surface.

17. The method of claim 16, wherein the EPC is configured to guide energy obtained from the energy beam to one or more sensors configured to measure the energy obtained from the energy beam.

18. The method of claim 16, wherein:

each first OHP, of the one or more first OHPs, comprises an evaporator adjacent to the target surface and a condenser located farther from the target surface than the evaporator, and spreading the heat comprises transferring the heat from the evaporator to the condenser.

19. The method of claim 18, wherein, in each first OHP, of the one or more first OHPs, the condenser and the evaporator are interconnected by capillary tubes perpendicular to the target surface.

20. The method of claim 16, wherein each first OHP, of the one or more first OHPs, comprises first capillary tubes perpendicular to the target surface.

* * * * *